(12) United States Patent
Engh-Halstvedt et al.

(10) Patent No.: US 10,089,709 B2
(45) Date of Patent: Oct. 2, 2018

(54) DATA PROCESSING SYSTEMS

(71) Applicant: ARM Limited, Cambridge (GB)

(72) Inventors: Andreas Due Engh-Halstvedt, Trondheim (NO); David James Bermingham, Cambridge (GB); Amir Kleen, Cambridge (GB); Jørn Nystad, Trondheim (NO); Kenneth Edvard Østby, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/208,459

(22) Filed: Jul. 12, 2016

(65) Prior Publication Data
US 2017/0024847 A1 Jan. 26, 2017

(30) Foreign Application Priority Data
Jul. 15, 2015 (GB) .................................. 1512335.9

(51) Int. Cl.
G06T 1/20 (2006.01)
G06T 15/00 (2011.01)
(52) U.S. Cl.
CPC .............. *G06T 1/20* (2013.01); *G06T 15/005* (2013.01)
(58) Field of Classification Search
CPC ......... G06T 1/20; G06T 15/005; G09G 3/363; G09G 5/363
USPC ................... 345/501, 503, 506, 522
See application file for complete search history.

(56) References Cited

U.S. PATENT DOCUMENTS

| 6,987,517 | B1 | 1/2006 | Donovan |
| 8,237,738 | B1* | 8/2012 | Crow ...................... G06T 11/40 |
| | | | 345/428 |
| 2002/0070946 | A1* | 6/2002 | Lewis ..................... G06T 15/04 |
| | | | 345/582 |

(Continued)

FOREIGN PATENT DOCUMENTS

WO WO2013015948 1/2013

OTHER PUBLICATIONS

EP Search and Examination Report dated Jan. 18, 2016, UK Patent Application GB1512335.9.

(Continued)

*Primary Examiner* — Jacinta M Crawford
(74) *Attorney, Agent, or Firm* — Vierra Magen Marcus LLP

(57) ABSTRACT

A graphics processing unit 3 includes a rasterizer 25, a thread spawner 40, a programmable execution unit 41, a varying interpolator 42, a texture mapper 43, and a blender 29. The programmable execution unit 41 is able to communicate with the varying interpolator 42, the texture mapper 43 and the blender 29 to request processing operations by those graphic specific accelerators. In addition to this, these graphics-specific accelerators are also able to communicate directly with each other and with the thread spawner 40, independently of the programmable execution unit 41. This allows for certain graphics processing operations to be performed using direct communication between the graphics-specific accelerators of the graphics processing unit, instead of executing instructions in the programmable execution unit to trigger the performance of those operations by the graphics-specific accelerators.

15 Claims, 12 Drawing Sheets

(56) References Cited

U.S. PATENT DOCUMENTS

| | | |
|---|---|---|
| 2003/0217112 A1 | 11/2003 | Emmot |
| 2004/0130927 A1* | 7/2004 | Schulz ............... G06F 15/7867 |
| | | 365/145 |
| 2008/0100627 A1* | 5/2008 | Nystad ................. G06T 15/005 |
| | | 345/502 |
| 2010/0110083 A1 | 5/2010 | Paltashev |
| 2012/0092353 A1 | 4/2012 | Paltashev |
| 2014/0204099 A1* | 7/2014 | Ye .................... H04N 21/42653 |
| | | 345/503 |

OTHER PUBLICATIONS

Parcerisa, et al., "Improving Latency Tolerance of Multithreading through Decoupling," IEEE Transactions on Computers, vo. 50, No. 10, Oct. 2001.

Chen, et al., "Hiding I/O Latency with Pre-execution Prefetching for Parallel Applications," Proceeding SC '08 Proceedings of the 2008 ACM/IEEE conference on Supercomputing, Article No. 40, Nov. 2008.

Lee, et al., "Prefetching with Helper Threads for Loosely Coupled Multiprocessor Systems," IEEE Transactions on Parallel and Distributed System, 2009.

* cited by examiner

PRIOR ART

```
VAR R0, 0              # In varying unit: interpolate attribute 0
                       # and put the result in register 0

TEX R0, R0, 0, 0       # In texture mapper: use the texture
                       # coordinates in register 0 to look up
                       # texture 0 using sampler 0, and put the
                       # result in register 0

<wait for fragment being oldest at its position>

Blend R0, 0            # send the colour in R0 for blending into
                       # render target 0

<end>                  # And that's all
```

FIG. 5

```
TEX_INDEX R0, <FragCoord.xy>, 0, 0
                           # In texture mapper: use the position
                           # of the current fragment as texture
                           # to look up texture 0 using sampler 0
                           # and put the result in register 0

<wait for fragment being oldest at its position>

ZS_EMIT  R0                # output the content of register 0
                           # as depth/stencil value <end>                      # And that's all
```

70

```
TEX_INDEX R0, <FragCoord.xy>, 0, 0
                           # In texture mapper: use the position
                           # of the current fragment as texture
                           # to look up texture 0 using sampler 0
                           # and put the result in register 0

<wait for fragment being oldest at its position>

BLEND  R0, 0               # output the content of register 0 for
                           # blending into render target 0

<end>                      # And that's all
```

DATA PROCESSING SYSTEMS

BACKGROUND

The present technology described herein relates to data processing systems, and in particular to arrangements for the execution of graphics processing operations in a graphics processing unit of a graphics processing system.

Graphics processing is typically carried out in a pipelined fashion, with one or more pipeline stages operating on the data to generate the final render output, e.g. frame that is displayed. Many graphics processing pipelines now include one or more so-called "shading" stages, commonly referred to as "shaders". For example, a graphics processing pipeline may include one or more of, and typically all of, a geometry shader, a vertex shader and a fragment (pixel) shader. These shaders are processing stages that execute shader programs on input data values to generate a desired set of output data (e.g. appropriately shaded and rendered fragment data in the case of a fragment shader) for processing by the rest of the graphics pipeline and/or for output.

A graphics "shader" thus performs graphics processing by running small programs for each graphics item in a graphics output to be generated, such as a render target, e.g. frame (an "item" in this regard is usually a vertex or a sampling position (e.g. in the case of a fragment shader)). This generally enables a high degree of parallelism, in that a typical render output, e.g. frame, features a rather large number of vertices and fragments, each of which can be processed independently.

In graphics shader operation, each "item" will be processed by means of an execution thread which will execute the shader program in question for the graphics "item" in question.

Modern graphics processing units (graphics processors) accordingly typically comprise one or more programmable execution units that can execute shader programs to perform graphics processing operations, together with one or more graphics-specific accelerators (processing units), such as a varying interpolator, a texture mapper and a blender. These graphics-specific accelerators perform specific graphics processing operations, such as varying interpolation, texture mapping and blending, under the control of the programmable execution unit.

FIG. 1 shows schematically such an arrangement of a graphics processing unit 101. As shown in FIG. 1, the graphics processing unit 101 includes a rasteriser 102, a thread spawner 103, a programmable execution unit 104, a varying interpolator 105, a texture mapper 106, and a blender 107.

The programmable execution unit 104 executes graphics shading programs, such as fragment shading programs, to perform graphics processing operations, such as (and in particular) shading (rendering) fragments generated by the rasteriser 102.

As part of this processing, and as shown in FIG. 1, the programmable execution unit 104 can call upon the varying interpolator 105, the texture mapper 106 and the blender 107 to perform specific graphics processing operations. To do this, the programmable execution unit will send appropriate messages to the relevant accelerator (and receive the appropriate response therefrom), e.g. in response to specific instructions in a shader program that it is executing.

The varying interpolator 105 operates to interpolate values across graphics primitives, and, as part of this operation, often creates texture coordinates to be used for sampling graphics textures.

The texture mapper 106 operates to sample graphics textures using texture coordinates, e.g. generated by the varying interpolator 105, and produces therefrom a filtered texture sample result (which it can then return to the programmable execution unit 104 for use, e.g. when shading sampling points).

The blender 107 operates to blend, e.g., fragment shading results generated by the programmable execution unit with previously generated fragment shader results, such as results that are already stored in the tile buffer (in the case of a tile-based graphics processing unit) and/or the frame buffer.

In operation of the graphics processing unit 101 shown in FIG. 1, the rasteriser 102 will rasterise graphics primitives to be processed to produce graphics fragments to be rendered (shaded).

The graphics fragments generated by the rasteriser 102 are then provided to the thread spawner 103. (The fragments may also be subject to various tests, such as depth and stencil tests, before being provided to the thread spawner 103, with only those fragments that pass all the relevant tests being provided to the thread spawner 103.)

The thread spawner 103 operates to spawn execution threads for execution by the programmable execution unit 104 for the fragments that it receives. It will, e.g., determine which shader program is to be executed for a fragment, and then spawn a thread or threads to execute it.

The programmable execution unit 104 then executes the appropriate shader programs for each thread that it receives from the thread spawner 103 to process the fragments generated by the rasteriser (and that pass the necessary tests) to produce the desired render output.

Once the programmable execution unit has finished its processing for a given fragment (including using the responses, if any, from the varying interpolator 105, texture mapper 106 and blender 107), the resulting shaded fragment (sampling position) values can be written out to memory, e.g. for output.

The Applicants believe that there remains scope for improved arrangements for graphics processing units that include both a programmable execution unit and graphics-specific accelerators.

BRIEF DESCRIPTION OF THE DRAWINGS

A number of embodiments of the technology described herein will now be described by way of example only and with reference to the accompanying drawings, in which:

FIGS. 5 and 6 show schematically a first embodiment of the technology described herein;

FIGS. 7 and 8 show schematically a second embodiment of the technology described herein;

Like reference numerals are used for like components where appropriate in the drawings.

DETAILED DESCRIPTION

Figure 1:
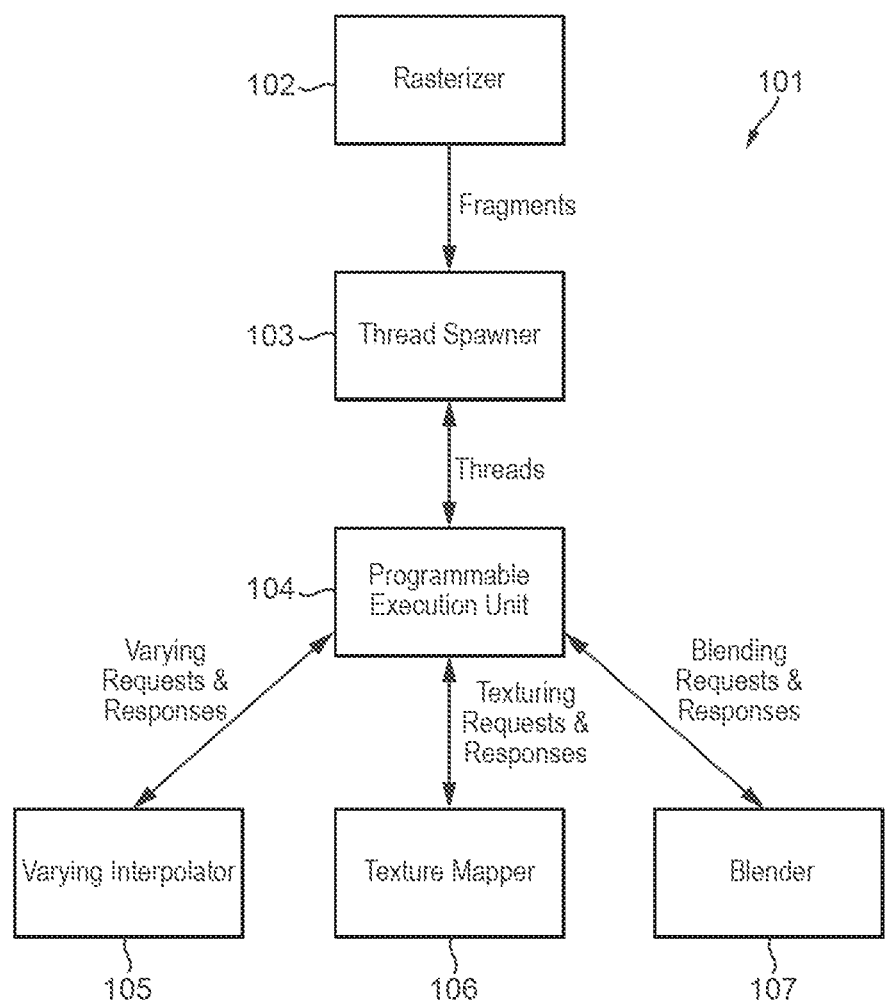
FIG. 1 shows schematically a graphics processing unit.

A first embodiment of the technology described herein comprises a graphics processing unit comprising:

a programmable execution unit operable to execute graphics processing programs to perform graphics processing operations; and a plurality of graphics-specific accelerators each operable to perform respective graphics processing operations; wherein:

the programmable execution unit is operable to communicate with the graphics-specific accelerators to cause the graphics-specific accelerators to perform graphics processing operations, and to receive responses from the graphics-specific accelerators; and further wherein:

two or more of the graphics-specific accelerators are operable to communicate directly with each other, in order to trigger graphics processing operations by at least one of the graphics-specific accelerators.

A second embodiment of the technology described herein comprises a method of operating a graphics processing unit that comprises:

a programmable execution unit operable to execute graphics processing programs to perform graphics processing operations; and a plurality of graphics-specific accelerators each operable to perform respective graphics processing operations; and in which:

the programmable execution unit is operable to communicate with the graphics-specific accelerators to cause the graphics-specific accelerators to perform graphics processing operations, and to receive responses from the graphics-specific accelerators;

the method comprising:

one of the graphics-specific accelerators communicating directly with another one of the graphics-specific accelerators, in order to trigger graphics processing operations by the another one of the graphics-specific accelerators.

The technology described herein relates to graphics processing units that include both a programmable execution unit and a plurality of graphics-specific accelerators (such as a varying interpolator, a texture mapper and a blender). In the technology described herein, as well as the graphics-specific accelerators being able to be controlled by the programmable execution unit, two or more of those accelerators can also communicate directly with each other. As will be discussed further below, the Applicants have recognised that this arrangement can lead to more efficient graphics processing.

In particular, the Applicants have recognised that for certain, potentially relatively common, graphics processing operations, for example that are typically performed by relatively simple shader programs, such as user interface (UI) composition and blitting, in practice all of the graphics processing operations can be performed by the graphics-specific accelerators.

While it would still be possible to execute these graphics processing operations by having the programmable execution unit communicate with and control the graphics-specific accelerators, the Applicants have recognised that that need not be necessary, and that instead, by allowing, as in the technology described herein, the graphics-specific accelerators to be able to communicate directly with each other, those shading operations can be performed using the graphics-specific accelerators without the need for any (or least as much) involvement of the programmable execution unit. This then has the advantage that it can remove the operations required for the programmable execution unit (such as creating a fragment shader thread, initialising it, and fetching and decoding the relevant fragment shader instructions) when performing such graphics processing operations. This may then save power, for example, as the programmable execution unit is no longer used (or at least not used as much (not executing as many instructions)).

The programmable execution unit can be any suitable and desired programmable execution unit that a graphics processing unit may contain. It should be operable to execute graphics shading programs to perform graphics processing operations. Thus the programmable execution unit will receive graphics threads to be executed, and execute appropriate graphics shading programs for those threads to generate the desired graphics output.

The programmable execution unit can execute any suitable and desired shader program, such as a vertex shader, a fragment shader or a compute shader (e.g. according to OpenCL or DirectCompute). In one embodiment the programmable execution unit executes a fragment shader program (a program for executing fragment shading operations).

There may be a single or plural programmable execution units. Where there are plural programmable execution units, each execution unit can in an embodiment operate in the manner of the technology described herein.

The graphics-specific accelerators of the graphics processing unit can be any suitable and desired special purpose graphics accelerators that a graphics processing unit may include. In an embodiment, the graphics-specific accelerators comprise two or more of, and in an embodiment all of: a varying interpolation unit (varying interpolator), a texture mapping unit (texture mapper) and a blending unit (blender). In an embodiment, the graphics-specific accelerators of the graphics processing unit comprise (at least) a varying interpolator, a texture mapper and a blender.

There may also be other accelerators (special purpose units) that are able to communicate directly with each other (and/or with the graphics specific accelerators), such as a load/store unit, and an arithmetic unit or units (such as a floating point matrix multiplier), etc., if desired.

The graphics-specific (and other) accelerators are in an embodiment fixed function units (i.e. hardware that is configured to perform the graphics-specific operations in question). However, they could also be completely or at least in part programmable units, e.g. that are operable to execute graphics programming instructions to perform the relevant graphics processing operations, if desired.

The programmable execution unit can in an embodiment communicate with all of the graphics-specific (and any other) accelerators of the graphics processing unit. Such communication in an embodiment comprises being able to send messages to the graphics-specific accelerators to trigger their processing operations, and being able to receive the corresponding responses from the graphics-specific accelerators.

Correspondingly, the graphics-specific accelerators are in an embodiment able to perform graphics processing operations in response to messages received from the programmable execution unit, and to return appropriate responses to the execution unit.

The graphics processing operations should (and in an embodiment do) produce some useful graphics processing output data, i.e. data for use in (subsequent) graphics processing operations, such as (an array of) vertex data, (an array of) fragment data, (an array of) interpolated data, (an array of) texture data, (an array of) blended data etc. Thus, in an embodiment, the programmable execution unit is operable to communicate with the graphics-specific accelerators to cause the graphics-specific accelerators to perform graphics processing operations so as to generate (an array of) graphics processing output data. In another embodiment, two or more of the graphics-specific accelerators are operable to communicate directly with each other, in order to trigger graphics processing operations by at least one of the graphics-specific accelerators so as to generate (an array of) graphics processing output data.

The generated output data may be further processed (in an embodiment for display), e.g. by a graphics processing pipeline, and/or provided to a display for display. Thus, in an embodiment, the generated output data is further processed, e.g. for display. In an embodiment, the generated output data is used to provide an image for display, e.g. is provided to a display for display.

At least two of the graphics-specific accelerators can communicate directly with each other.

Where there are more than two graphics-specific accelerators, it would be possible for only a subset of those graphics-specific accelerators to be able to communicate directly with each other, or all of the graphics-specific accelerators could communicate directly with each other.

In an embodiment, respective pairs of the graphics-specific accelerators are able to communicate directly with each other. For example, and in an embodiment, the varying interpolator (if present) can in an embodiment communicate directly with the texture mapper, and/or the texture mapper can communicate directly with the blender. The varying interpolator could also communicate directly with the blender if desired, but this may not be necessary.

Where graphics specific accelerators can communicate directly with each other, that communication could be two-way, or it may only be one-way (or it may be the case that, e.g., commands can only be sent one-way between the two accelerators, with responses only being sent the other way).

Thus, for those graphics-specific accelerators that can communicate directly with each other, that communication could comprise both the ability to send messages requesting graphics processing operations and receiving corresponding responses. However, it could also be the case that the communication between the graphics-specific accelerators is one way only, i.e. such that a given accelerator can send a message to another accelerator (e.g. requesting processing operations by that accelerator), but there is no corresponding return path for the result of those processing operations (rather, e.g., and in an embodiment, the result may then be communicated directly to another of the graphics-specific accelerators, and/or to the programmable execution unit or another unit of the graphics processing unit, and/or otherwise output (and in an embodiment this is the case)).

In an embodiment, where the graphics-specific accelerators include a varying interpolator, a texture mapper and a blender, the varying interpolator can communicate directly with the texture mapper to request texturing operations, and the texture mapper can communicate directly with the blender to request blending operations.

The graphics-specific accelerators in an embodiment communicate directly with each other by passing appropriate messages to each other. These messages may take any suitable and desired form, and may contain, for example, appropriate commands to trigger processing operations by the graphics-specific accelerator that the message is intended for, and, optionally and in an embodiment, relevant data for those processing operations (and/or an indication of where the relevant data for those processing operations may be found). Other arrangements would, of course, be possible.

While the graphics-specific accelerators are able to communicate directly with each other (i.e. such that their communication does not pass via any of the other units of the graphics processing unit (such as the programmable execution unit)), in an embodiment, the direct communication between the graphics-specific accelerators can be, and is in an embodiment, triggered by a communication (e.g. a message) to one of the graphics-specific accelerators that communicates directly with another of the graphics-specific accelerators from another unit of the graphics processing unit. In this case, the unit of the graphics processing unit that triggers the direct communication between the graphics-specific accelerators could be any desired and suitable unit of the graphics processing unit. As will be discussed further below, in embodiments the direct communication between the graphics-specific accelerators is triggered by the thread spawner and/or the programmable execution unit of the graphics processing unit.

In an embodiment, the direct communication between the graphics-specific (or other) accelerators comprises one accelerator communicating directly with another of the accelerators to trigger a processing operation or operations by another of the accelerators (and without the involvement of any other unit, such as, and in an embodiment, the programmable execution unit, of the graphics processing unit).

The communication between the graphics-specific accelerators and between the accelerators and the programmable execution unit can be facilitated as desired. There is in an embodiment an appropriate communication (messaging) network for passing messages between the various units. This communication (messaging) network can operate according to any desired communications protocol and standard, such as using a suitable "network on a chip" protocol.

As well as the programmable execution unit and the graphics-specific accelerators, the graphics processing unit of the technology described herein in an embodiment also comprises at least a rasteriser and a thread spawner.

The rasteriser is in an embodiment operable to rasterise graphics primitives to be rendered to produce graphics fragments to be rendered.

Thus, the rasteriser will in an embodiment test primitives to be rendered against sampling positions of the render output being generated, and generate fragments to be rendered for each sampling position (or respective set of sampling positions (e.g. each 2×2 quad of sampling positions)) that is covered by (or that includes at least one sampling position that is covered by) the primitive in question, with the fragments that are generated by the rasteriser for rendering a primitive then being sent onwards for processing. Each fragment will accordingly correspond to and be used to render a set of sampling positions (with each set of sampling positions comprising one sampling position or plural sampling positions, depending upon whether the fragments represent individual sampling positions or sets, e.g. quads, of plural sampling positions).

The thread spawner is in an embodiment operable to receive graphics fragments to be rendered and to, inter alia, and where appropriate, spawn execution threads for rendering those graphics fragments for execution by the programmable execution unit. Each sampling position that a fragment represents is in an embodiment processed as a respective execution thread that is spawned by the thread spawner.

The Applicants have recognised that not every set of graphics processing operations (e.g. shader program) to be performed when generating a render output may be suitable for execution by means of direct communication between graphics-specific accelerators of the graphics processing unit. Thus, in an embodiment, the graphics processing unit and the overall graphics processing system that the graphics processing unit is part of (that may, e.g., and in an embodiment, accordingly comprise a host processor that executes applications that require graphics processing by the graphics processing unit) is configured to be able to, and is operable to, identify appropriate opportunities for performing graphics processing operations by direct communication between graphics-specific accelerators of the graphics processing unit.

Thus, in an embodiment, the graphics processing system is configured and operable to identify graphics shader programs that are to be executed by the graphics processing unit for which direct communication between the graphics-specific accelerators of the graphics processing unit would be appropriate. In an embodiment, there is a particular, in an embodiment selected, in an embodiment predefined, set of shader programs that are suitable for direct communication between the graphics-specific accelerators and the graphics processing system is configured to be able to identify those forms of shader program.

These forms of shader program can comprise any suitable and desired shader program operations that can be executed using only the graphics-specific accelerators. Thus, they are in an embodiment shader programs that only require one or more of varying interpolation operations, texturing operations and blending operations. For example, and in an embodiment, the graphics processing system could identify shader programs that only comprise varying interpolation, texturing and blending operations, and/or that only comprise texturing and blending operations.

The identification of those shader programs for which the graphics processing may be performed by direct communication between graphics-specific accelerators of the graphics processing unit can be performed by any suitable and desired element or component of the overall graphics processing system. In an embodiment, the compiler (the shader program compiler) for the programmable execution unit of the graphics processing unit performs this identification, i.e. identifies whether a given shader program to be compiled for execution by the graphics processing unit is suitable for having some or all of its processing performed by means of direct communication between graphics-specific accelerators of the graphics processing unit.

Where a shader program to executed that is suitable for its processing operations to be performed by means of direct communication between graphics-specific accelerators of the graphics processing unit is identified, then that is in an embodiment conveyed (indicated) to the graphics processing unit. This can be done in any appropriate and desired manner. In an embodiment an appropriate data structure, such as a flag, is set to indicate that some or all of the shader program is appropriate for execution by means of direct communication between the graphics-specific accelerators of the graphics processing unit.

This indication can be provided by any suitable and desired component and element of the graphics processing system. In an embodiment the driver for the graphics processing unit that is, e.g., executing on the host processor of the overall graphics processing system, provides this indication, in an embodiment by setting an appropriate data structure, e.g. flag, appropriately. The compiler may, e.g., inform the driver that a shader program has been identified as a suitable candidate for operation in the manner of the technology described herein, with the driver then setting a, e.g. flag, that informs the graphics processing unit of this accordingly.

In an embodiment, even if it is recognised that some or all of a shader program can be executed by means of direct communication between graphics-specific accelerators of the graphics processing unit, the shader program itself is still compiled and provided to the graphics processing unit for execution in the normal manner. The Applicants have recognised in this regard that for some, e.g. fragments to be processed, it may be preferable for the relevant graphics processing operations to still be performed by execution of the shader program by the programmable execution unit of the graphics processing unit. Providing the executable version of the shader program to the graphics processing unit, so that it can still be executed by the programmable execution unit where that is required, facilitates this.

Correspondingly, in an embodiment, the graphics processing unit is further configured to determine (and determines) when it is executing a shader program for which some or all of the operations can be performed by direct communication between the graphics-specific accelerators, for a given graphics entity (work item) or group of entities (group of work items) to be processed, whether that entity or group of entities should be processed by executing the shader program (using the programmable execution unit) for that entity or group of entities, or whether the graphics processing operation(s) should be performed for that entity (work item) or group of entities (group of work items) by means of direct communication between the graphics-specific accelerators.

The graphics entity or entities in this regard may be, and are in an embodiment, any suitable graphics entity or entities (work item or items) that a graphics shader program may be used (executed) to process, i.e. that an execution thread or threads to be executed by the programmable execution unit can represent. Thus, the graphics entity (or entities) is in an embodiment a vertex, a sampling position, or a fragment, etc. In an embodiment the graphics entities are graphics fragments (generated by the rasteriser).

This determination is in an embodiment based on whether the entity or group of entities, e.g., graphics fragment or fragments, to be processed, meet certain, particular, in an embodiment selected, in an embodiment predefined, criteria or conditions that indicates that they are suitable for processing using direct communication between the graphics-specific accelerators (or not).

In other words, as well as the use of direct communication between the graphics accelerators for performing certain processing operations being dependent upon the graphics processing operations (e.g. the shader program) that are to be performed, that operation is in an embodiment also dependent upon one or more other conditions or criteria, and in an embodiment also dependent on whether the graphics entity or entities in question, e.g., and in an embodiment whether a given graphics fragment or fragments to be processed, meets certain, in an embodiment selected, conditions or criteria.

The conditions or criteria that are considered in this regard can be any suitable and desired conditions and criteria that could be used to determine, e.g., whether a given graphics fragment or set of graphics fragments could have some or all of their processing performed by means of direct communication between the graphics-specific accelerators or not.

In an embodiment, the conditions relate to whether a property or properties of the graphics entity(s), e.g. fragment or set of fragments, to be processed means that their processing could require functions of the programmable execution unit or not (and that are, e.g., not otherwise available to the graphics-specific accelerators without the "assistance" of the programmable execution unit). An example of this might be where a given fragment to be processed has a dependency, e.g. on other fragments to be processed (which dependency may then need to be tracked for the processing of that fragment, and/or may require additional information to be conveyed to the graphics-specific accelerators (which additional information may, e.g., already be supported by the programmable execution unit)).

In an embodiment, where graphics fragments are being processed, the conditions comprise one or more of, and in an embodiment all of: whether the fragment to be processed has full coverage (i.e. whether all the sampling positions that the fragment represents are covered by the primitive that the fragment is being used to process or not); whether the fragment to be processed has an allocated tile buffer (in a tile-based system); and whether the fragment to be processed is the oldest at its position in the render output (i.e. for the sampling positions in the render output that the fragment is being used to process). In an embodiment, if these (or the relevant ones) of the these conditions are met, then the fragment is processed using direct communication between the graphics-specific accelerators, but if any one of these conditions (that is being considered) is not met, then the fragment is processed by executing the fragment shader program for the fragment (for threads corresponding to the fragment) in the programmable execution unit in the normal manner.

Other conditions could be considered as well, for example in relation to how complicated the processing that the fragment is to undergoes, such as whether more complicated features, such as alpha test, alpha-to-coverage, etc., are enabled for the fragment (this may be indicated e.g., by the render state for the fragment). Such more complicated features and operations may be more desirably performed by executing the fragment shader program in the programmable execution unit.

When it is determined that a graphics entity or entities, e.g. a fragment or set of fragments, is to be processed via means of direct communication and messages between the graphics-specific accelerators, then that can be triggered and implemented in any suitable and desired manner.

In an embodiment, a predefined message or messages is issued appropriately to the graphics-specific accelerators to cause them to perform the necessary processing operations. The message or messages in question, and the graphics-specific accelerators that they are sent to, may, and in an embodiment do, depend upon the nature of the graphics processing operations that are required. For example, where varying interpolation is required, then a message to trigger that operation could be sent to the varying interpolator. Correspondingly, where texture mapping is required, a message to trigger that operation could be sent to the texture mapper.

In an embodiment, it is possible to issue a message sequence (a combined message) that will be progressively passed between the graphics-specific accelerators (independently of the programmable execution unit) that are to perform the graphics processing operations in question.

Thus, for example, where the graphics processing operations that are required comprise varying interpolation, texture mapping and blending, in an embodiment a, in an embodiment predefined, "varying+texture+blend" message sequence can be issued that sends one "varying+texture+blend" message to the varying interpolator, with the varying interpolator once it has completed its operations, then sending a "texture+blend" message to the texture mapper, with the texture mapper once it has completed its operations, then sending a "blend" message to the blending unit. Correspondingly, if the operation that is required is a texture lookup and then blending, in an embodiment a combined "texture+blending" request message sequence can be sent, first to the texture mapper, with the texture mapper then sending the blending request part of the message sequence to the blender.

In the case where it is determined that the graphics processing for the graphics entity or entities, e.g. fragment or set of fragments, in question cannot be performed using direct communication between the graphics-specific accelerators, then instead of issuing a message or messages to the graphics-specific accelerators as discussed above, in an embodiment execution threads for the graphics entity or entities (e.g. fragment or fragments) are spawned and issued to the programmable execution unit for execution of the shader program in question by the programmable execution unit for the graphics entity (e.g. fragment) in the normal manner.

Thus, in an embodiment, when a graphics entity or set of entities (e.g. fragment or set of fragments) is to be processed, it is determined whether the graphics entity or set of entities (e.g. a fragment or set of fragments) meets the particular criteria for processing using the graphics-specific accelerators independently of the programmable execution unit or not, and in response to that determination, either a message or messages (or a message sequence) is issued directly to one or more of the graphics-specific accelerators in order to perform processing operations for the graphics entity or set of entities (e.g. fragment or fragments) in question, or execution threads are spawned for the graphics entity or set of entities (e.g. fragment or fragments) in question and issued to the programmable execution unit for execution.

The above operations can be performed by any suitable and desired element or component of the graphics processing unit. In an embodiment, it is the thread spawner of the graphics processing unit that is operable in this manner (i.e. determines whether graphics entity or set of entities (e.g. fragments) that it receives for processing should be processed by executing the shader program for those graphics entities (e.g. fragments) in the programmable execution unit or whether they can be processed by using the graphics-specific accelerators independently of the programmable execution unit, and then either spawns execution threads or issues messages to the graphics-specific accelerators accordingly).

The above operation is in an embodiment repeated for plural, and in an embodiment for each, graphics entity or set of graphics entities (i.e. fragment or set of fragments) to be processed for a given shader program (that a given shader program is to be executed for). Correspondingly the operation of determining whether a shader program can potentially be executed using direct communication between the graphics-specific accelerators is in an embodiment made for plural, and in an embodiment for each, shader program or programs to be executed when the graphics processing unit is to generate a render output (and correspondingly for plural and in an embodiment for each render output that the graphics processing unit is required to generate).

The technology described herein also extends to this operation, e.g. of the thread spawner.

Thus, a further embodiment of the technology described herein comprises a graphics processing unit comprising:

a programmable execution unit operable to execute graphics processing programs to perform graphics processing operations; and a plurality of graphics-specific accelerators each operable to perform respective graphics processing operations; and processing circuitry operable to receive graphics entities to be processed, and to, for a graphics entity to be processed, spawn an execution thread or threads for execution by the programmable execution unit, and/or issue a message directly to one or more of the graphics-specific accelerators, in order to trigger processing operations for the graphics entity or entities in question.

A further embodiment of the technology described herein comprises a method of operating a graphics processing unit that comprises:

a programmable execution unit operable to execute graphics processing programs to perform graphics processing operations; and a plurality of graphics-specific accelerators each operable to perform respective graphics processing operations;

the method comprising:

determining for a graphics entity to be processed, whether to spawn an execution thread or threads for execution by the programmable execution unit, or to issue a message directly to one or more of the graphics-specific accelerators, in order to trigger processing operations for the graphics entity in question; and spawning an execution thread or threads for execution by the programmable execution unit, and/or issuing a message directly to one or more of the graphics-specific accelerators, in order to trigger processing operations for the graphics entity, in response to the determination.

As will be appreciated by those skilled in the art, these embodiments of the technology described herein can, and in an embodiment do, include any one or more of the features of the technology described herein, as appropriate.

Thus, for example, the graphics entities are in an embodiment graphics fragments. Similarly, the determination of whether to spawn execution threads or issue messages to the graphics-specific accelerators for the graphics entity in question is in an embodiment based on whether the graphics entity (e.g. fragment) meets certain, and in an embodiment selected, in an embodiment predefined, conditions or criteria or not, and/or on whether the shader program that is to be executed for the graphics entity in question meets certain criteria, e.g. is of a particular form.

Similarly, it is in an embodiment a thread spawner of the graphics processing unit that either spawns the execution threads or issues messages to the graphics-specific accelerators (and also performs the determination of which of those techniques to use for processing a given graphics entity).

The above embodiments relate to arrangements in which direct communication between the graphics-specific accelerators is used instead of executing a shader program to process a given graphics entity, e.g. fragment.

However, the Applicants have also recognised that processing graphics entities, e.g. fragments, using both direct communication between the graphics-specific accelerators and by executing a shader program to perform processing operations for a given graphics entity (or group of entities) could be used to make graphics processing operations more efficient.

For example, the Applicants have recognised that many shader programs include initial varying interpolation operations to generate texture coordinates, followed by the use of those texture coordinates in the texture mapper to sample a texture, with other operations, e.g. that use the sampled texture then being performed.

However, the varying interpolation operation to generate the texture coordinates and the use of those texture coordinates in the texture mapper to sample a texture can take a significant time (number of execution cycles) to be performed and to return their data. However, while this is happening, any resources, such as registers allocated to the execution threads will be, in effect, idle.

The Applicants have recognised that if the initial operations to perform varying interpolations to generate texture coordinates and the use of those texture coordinates in the texture mapper to sample a texture could be performed by direct communication between the graphics-specific accelerators (with the result then being returned to the programmable execution unit for the rest of the graphics processing to be performed by executing a shader program for the graphics entity), then that may allow the latency (such as register allocation latency) associated with resources being allocated to threads during the period while the varying and texturing operation data is being determined and returned to be avoided or at least reduced.

Thus, in an embodiment, a graphics entity to be processed is processed by using both direct communication between two or more of the graphics-specific accelerators in order to perform processing operations for the graphics entity in question, and by executing a shader program in the programmable execution unit to perform other processing operations for the graphics entity. In an embodiment the graphics entity is processed by the graphics-specific accelerators first performing processing operations by means of direct communication between the graphics-specific accelerators, and then, once those processing operations have been completed and the result returned, an execution thread or threads is executed to execute a shader program (that, in an embodiment, uses the result or results returned by the graphics-specific accelerators) to perform further processing operations for (and in an embodiment to complete the processing of) the graphics entity.

Thus, in an embodiment, when a graphics entity or set of entities (e.g. fragment or set of fragments) is to be processed, both a message or messages (or a message sequence) is issued directly to one or more of the graphics-specific accelerators in order to perform processing operations for the graphics entity or sets of entities (e.g. fragment or fragments) in question, and an execution thread or threads are spawned for the graphics entity or entities (e.g. fragment or fragments) in question and issued to the programmable execution unit for execution. Again, it is in an embodiment the thread spawner of the graphics processing unit that is operable in this manner (i.e. that both issues messages to the graphics-specific accelerators and spawns execution threads accordingly).

In an embodiment a message in one of the forms discussed above is issued to the graphics-specific accelerators, e.g., and in an embodiment, depending upon the operations of the shader program that are to be performed by direct communication between the graphics-specific accelerators independently of the programmable execution unit. Thus, in an embodiment, a "varying+texture" message sequence is issued, that is sent to the varying interpolator, with the varying interpolator once it has completed its operations, then sending a "texture" message to the texture mapper, with the texture mapper once it has completed its operations, then returning the texturing result to the programmable execution unit.

In an embodiment the result of the operations triggered by direct communication between the graphics-specific accelerators is returned to the programmable execution unit for use when executing the shader program for the graphics entity or entities in question.

The shader program that is executed for and to process the graphics entity or entities in these arrangements can be any suitable and desired shader program.

The Applicants believe that these embodiments of the technology described herein will have particular application to shader programs where there is an initial operation to load data for use in the shader program, such as fragment shaders that preload textures and/or uniforms, vertex shaders that preload attribute values and/or addresses, blend shaders that preload tile values, and compute shaders that preload input data. Thus in an embodiment, these embodiments are used for shader programs that include a "preload" operation or operations.

In one embodiment, the shader program that is to be executed is modified to take account of the fact that some of the processing operations will be performed by means of direct communication between the graphics-specific accelerators. In this case, the shader program may be, and is in an embodiment, modified to remove any shader program instructions from the shader program that is to be executed by the programmable execution unit whose operations will instead be performed by direct communication between the graphics-specific accelerators.

Where the shader program to be executed by the programmable execution unit is to be modified by having some or all of its operations performed by means of direct communication between graphics-specific accelerators, then the shader program can be modified in any suitable and desired manner and by any suitable and desired element of the overall data (graphics) processing system.

In an embodiment, the shader program is modified by the compiler (the shader compiler) for the graphics processing unit. Thus the compiler in an embodiment, e.g., modifies the shader program by removing instructions from the shader program provided by the application that is requesting the graphics processing whose operations will instead be performed by using direct communication between the graphics-specific accelerators. Thus, for example, and in an embodiment, the, e.g. compiler, may remove a varying or varying+texturing instruction(s) from the compiled shader program (binary) that is provided to the programmable execution unit for execution.

In an embodiment, the compiler analyses the shader program code that is provided, e.g. by the application on the host processor that requires the graphics processing, determines whether shader program operations can be performed by means of a message triggering direct communication between the graphics-specific accelerators (and then in an embodiment in that case removes those instructions from the shader program).

In another embodiment, the instructions that may be, in effect, replaced, by performing processing operations by means of direct communication between the graphics-specific accelerators could be (and in an embodiment are) left in (not removed from) the shader program (in the shader program binary), with the execution of the shader program then being configured to be able to omit (skip) those instructions when the relevant processing operations are performed by means of direct communication between the graphics-specific accelerators. This would then allow those instructions to still be executed for a thread in the event that for whatever reason the use of direct communication between the graphics-specific accelerators to perform those operations is not used (e.g. because that is having or could have a detrimental effect on other system resources).

Thus in an embodiment, the "complete" shader program is provided to the execution unit for execution, but the execution unit is able to, and in an embodiment does, conditionally omit (not execute) instructions in the shader program, e.g., and in an embodiment, in dependence upon whether messages triggering the relevant processing operations by means of direct communication between the graphics-specific accelerators have been sent.

Thus, the operation to perform the processing both by means of messages triggering direct communication between the graphics-specific accelerators and by executing the appropriate parts of a shader program for the graphics entity or entities in question may be configured either by means of the, e.g., compiler modifying the shader program, or by having the execution hardware configured to be able to (and operating) in the appropriate manner (where it is to do that).

In either case, the number of instructions to be executed for the shader program can be reduced, and latency when executing the shader program can be reduced, whilst still having the features provided by processing the entity or entities by executing a shader program in the programmable execution unit.

The fact that a graphics entity or entities is to be processed both by means of a message to trigger direct communication between the graphics-specific accelerators and shader program execution can be indicated and triggered in any suitable and desired manner. In an embodiment, an appropriate data structure, such as a flag, or other shader descriptor, is used to indicate that the processing for the shader program operations is to be performed both by means of issuing a message to trigger processing by direct communication between the graphics-specific accelerators of the graphics processing unit and by spawning a thread or threads to execute a shader program for the graphics entity or entities.

In the case where the shader program is modified to remove instructions, that are instead performed by direct communication between the graphics-specific accelerators, the "shader descriptor" could, e.g., indicate the message or messages that are to be sent directly to the graphics-specific accelerators, the shader program to be executed, and, in an embodiment, an indication that the completion of the final "direct communication" message does not complete the processing for the graphics entity or entities (but rather that the shader program must then be executed).

In the case where the shader program is left in its "complete" form, but instructions may be omitted when executing the shader program in the event that those instructions are performed instead by means of direct communication between the graphics-specific accelerators, then the "shader descriptor" in an embodiment indicates the shader program that is to be executed, the message or messages that are to be sent to trigger the operations by means of direct communication between the graphics-specific accelerators, and those instructions in the shader program that should be omitted (not executed) if the message or messages are sent.

Where a graphics entity or entities is processed in this manner, then the shader program execution should not be, and in an embodiment is not, started until the processing results of the processing operations that are performed by means of direct communication between the graphics-specific accelerators are available. Thus, in an embodiment, the execution of the shader program for the graphics entity or entities waits until the results of the processing operations that are performed by means of direct communication between the graphics-specific accelerators have been generated.

Thus, in embodiments, execution threads that execute the (e.g. modified) shader program are not executed in the programmable execution unit until the results of the operations performed by means of direct communication between the graphics-specific accelerators have been returned to the programmable execution unit (are available to the programmable execution unit).

Again, it could be indicated in a data structure, such as a descriptor, for the shader program, which message or messages need to return their results before the thread for executing the shader program should be executed. For example, there may be a pointer to a list of messages (processing operations) to be completed before thread execution is started.

It would be possible to spawn the execution thread to execute the shader program essentially in parallel with the issuing of the message or messages triggering the processing operations performed by direct communication with the graphics-specific accelerators (but with the execution threads not then being executed until the results of the processing operations being performed by means of direct communication between the graphics-specific accelerators have been returned).

However, in an embodiment the execution thread(s) that are to execute the (e.g. modified) shader program are not spawned until the results of the operations performed by means of direct communication between the graphics-specific accelerators have been returned to (are available to) the programmable execution unit.

(It should be noted here, that in contrast to the execution of the execution threads, the messages that are to trigger the processing operations by means of direct communication between the graphics-specific accelerators can be issued (and the corresponding processing operations performed), without a thread or thread state having already been spawned or allocated.)

Thus, in embodiments, the execution threads that are to execute the (e.g. modified) shader program are not issued for execution to the programmable execution unit until the results of the operations performed by means of direct communication between the graphics-specific accelerators have been returned to the programmable execution unit (are available to the programmable execution unit).

Correspondingly, in an embodiment, the completion of the processing operations that are being performed by means of direct communication between the graphics-specific accelerators is monitored and tracked, and execution threads are only released for execution once it has been determined that the relevant operations have been completed (that the relevant dependencies on the operations being performed by means of direct communication between the graphics-specific accelerators have been met).

Correspondingly, in an embodiment, at least some, and in an embodiment all, of the resources required and to be used when executing the execution threads, such as registers, are not allocated until the results of the operations performed by means of direct communication between the graphics-specific accelerators have been returned (are available to the programmable execution unit).

In other words, in an embodiment some, and in an embodiment all, of the resources required and to be used when executing the execution threads, such as registers, are only allocated once the results of the operations performed by means of direct communication between the graphics-specific accelerators are available to the programmable execution unit.

The results of the operations performed by means of direct communication between the graphics-specific accelerators can be made available to the programmable execution unit in any appropriate and desired manner. For example, where a corresponding execution thread for the graphics entity in question has been spawned and has registers allocated to it, then the results of the operations performed by means of direct communication between the graphics-specific accelerators can be stored in the registers for the thread, as appropriate.

Alternatively, e.g. where the thread register allocation is not done until the results of the operations performed by means of direct communication between the graphics-specific accelerators have been returned, instead a set of registers could be set aside for storing those results, with the relevant registers then being read by the appropriate execution thread when it is executed. In this case, as only a smaller number of registers should be required to store the results of the operations performed by means of direct communication between the graphics-specific accelerators than might be required for the thread register allocation for executing the shader program, then even though some registers will need to be set aside for storing the results of the operations performed by means of direct communication between the graphics-specific accelerators, the set of registers that is set aside for this process should be significantly fewer registers than would be idle if the relevant operations were being performed by an execution thread executing appropriate instructions to perform those operations.

Thus, in an embodiment, registers are set aside for the storage of the results generated by means of the processing operations performed by direct communication between the graphics-specific accelerators and other registers (if required) are allocated appropriately for use by execution threads when the threads are released and/or spawned to execute the shader program.

Then, once the results of the processing operations performed by means of direct communication between the graphics-specific accelerators for a given graphics entity have been returned (and are thus stored in the registers allocated for that purpose), a set of registers for the corresponding execution thread for that entity is then allocated for the execution thread for that entity, such that the execution thread can then be executed, together with an indication of which registers store the results of the processing operations that were performed by means of direct communication between the graphics-specific accelerators.

It would also be possible to provide an arrangement in which a graphic entity or entities may be processed either by solely using direct communication between the graphics-specific accelerators, or by using both direct communication between the graphics-specific accelerators and executing a thread or threads to execute a shader program for the graphics entity or entities.

For example, the, e.g., thread spawner, could be configured to determine whether a required varying+texturing+blend operation could be done solely by means of direct communication between the graphics-specific accelerators, and to, if so, issue a message to do that, but to, where it is determined that that operation cannot be done solely by direct communication between the graphics-specific accelerators (e.g. due to incomplete coverage of the fragment in question), instead trigger the processing of the fragment by means of issuing a varying+texturing message to perform those operations by direct communication between the graphics-specific accelerators, and spawning an execution thread to execute a fragment shader program to perform the remaining processing operations for the fragment.

The Applicants have also recognised that direct communication between the graphics-specific accelerators could be used to make operations within a shader program more efficient, even if other parts of the shader program still need to be executed for the graphics entity by the programmable execution unit. In other words, the Applicants have also recognised that it would be beneficial to be able to (and to) use direct communication between the graphics-specific accelerators during execution of a shader program.

For example, a shader program being executed may require varying interpolation to generate texture coordinates, and then the use of those texture coordinates in the texture mapper to sample a texture. While this could be performed by having a shader program execute two instructions, a first varying instruction to fetch the texture coordinates from the varying interpolator, and then a texture instruction to trigger the texture unit to use those texture coordinates to sample the texture, the Applicants have recognised that such an operation could be made more efficient if the varying unit could communicate the texture request directly to the texture unit, as that will then avoid, e.g., the need to execute a texture instruction in the programmable execution unit.

Thus, in an embodiment, the programmable execution unit is operable to be able to issue a message or messages to one or more of the graphics-specific accelerators that will then cause the graphics-specific accelerators to communicate directly with each other to perform graphics processing operations (and e.g., return a response to or result of those graphics processing operations to the programmable execution unit).

Such a message can again take any suitable and desired form, but is in an embodiment of the form discussed above.

Thus, the programmable execution unit can in an embodiment issue a message sequence (a combined message) that will be progressively passed between plural of the graphics-specific accelerators (independently of the programmable execution unit) that are to perform the graphics processing operations in question.

For example, similarly to as discussed above, the programmable execution unit could potentially issue a combined "varying+texture+blend" message sequence to the varying interpolator, with the varying interpolator once it has completed its operations, then sending a "texture+blend" message to the texture mapper, with the texture mapper once it has completed its operations, then sending a "blend" message to the blending unit, with the blending unit then returning the result, e.g. to the programmable execution unit.

In an embodiment of these arrangements, the programmable execution unit can issue a combined, in an embodiment predefined, "varying+texture" message sequence, that is sent to the varying interpolator, with the varying interpolator once it has completed its operations, then sending a "texture" message to the texture mapper, with the texture mapper once it has completed its operations, then returning the texturing result to the programmable execution unit.

The message that is sent from the programmable execution unit to the graphics-specific accelerator should contain any information that is required to perform the relevant graphics processing operations. In the case of a system with plural programmable execution units at least, the message in an embodiment also indicates the sender of the message (i.e. which execution unit has sent the message), so that the result of the graphics processing operations can be returned to the correct execution unit.

The sending of such a message to a graphics-specific accelerator by the programmable execution unit can be implemented and triggered in any desired and suitable manner. In an embodiment, this is achieved by including an appropriate instruction in a shader program to be executed by the programmable execution unit that will trigger the execution unit to send an appropriate message to the graphics-specific accelerator in question (with the execution unit then sending the message when it reaches the relevant instruction in the shader program).

Thus, in an embodiment, the technology described herein comprises issuing to the programmable execution unit of the graphics processing unit a shader program for execution by the programmable execution unit that includes an instruction to cause the programmable execution unit to issue a message to one of the graphics-specific accelerators to cause that graphics-specific accelerator to communicate directly with another one of the graphics-specific accelerators to cause both graphics-specific accelerators to perform graphics processing operations; and the programmable execution unit when executing the shader program, when it reaches the instruction in the shader program, issuing a message to one of the graphics-specific accelerators to cause that graphics-specific accelerator to perform a graphics processing operation or operations, and to then communicate directly with another of the graphics-specific accelerators to cause that graphics-specific accelerator to perform a graphics processing operation.

In an embodiment the arrangement is such that the "end" graphics-specific accelerator in the sequence of direct communication is also triggered to return its result to the programmable execution unit, with the programmable execution unit, e.g., and in an embodiment, then executing further instructions in the shader program that, e.g., and in an embodiment, use the result of the processing by the graphics-specific accelerators.

Such an instruction can be included in a shader program to be executed by the programmable execution unit in any suitable and desired manner and by any suitable and desired element of the overall data (graphics) processing system.

In an embodiment, the "direct communication" instruction is included in the shader program by the compiler (the shader compiler) for the graphics processing unit. Thus the compiler in an embodiment, e.g., inserts a "direction communication" instruction at the appropriate point in the, e.g. fragment, shader program. Having the compiler provide the instruction has the advantage that the compiler is able to assess the shader program to determine if it is possible to include a "direct communication" instruction in the shader program.

In an embodiment, the compiler analyses the shader program code that is provided, e.g. by the application on the host processor that requires the graphics processing, determines whether a "direct communication" operation at some point in the shader program execution is possible, and if so, then includes a "direct communication" instruction at the appropriate point in the shader program (e.g. by inserting the instruction in the shader program at that point).

In an embodiment, the compiler is also operable to (where this is possible) re-order operations in the shader program so as to, e.g., provide an opportunity to include a "direct communication" operation in the shader program execution, and/or so as to allow for the more efficient inclusion and use of a "direct communication" operation in the execution of the shader program.

Thus, in an embodiment, the system, e.g. compiler, is operable to identify instructions in a shader program to be executed that could be replaced and/or combined by the use of direct communication between the graphics-specific accelerators of the graphics processing unit, and when such a sequence of instructions is identified, to replace those instructions by a "combined" ("fused") instruction that will cause the programmable execution unit to issue an appropriate message or message sequence to the graphics-specific accelerators to trigger the performance of the graphics processing operations in question by means of direct communication between graphics-specific accelerators of the graphics processing unit.

It would also be possible to include plural "direct communication" events (instructions) in a shader program, if desired.

The operation in the manner of the technology described herein to identify and provide "direct communication" opportunities in, or in combination with, or instead of, a shader program to be executed can be (and in one embodiment is) considered for each and every shader program that is to be executed by the graphics processing unit. It would also be possible to do this only for particular categories or types of shader programs but not for other categories or types of shader programs (e.g. where the type of shader program is unlikely to offer useful "direct communication" opportunities).

In an embodiment the operation in the manner of the technology described herein to identify and provide "direct communication" opportunities is performed for fragment shader programs to be executed (and in an embodiment for each and every fragment shader program that is to be executed by the graphics processing unit).

(However, it is not necessary that each and every, e.g. fragment, shader program has to have a direct communication operation included in or with or instead of it, for example where the compiler determines that that may not be possible or so useful in or for the shader program in question.)

It would also be possible, if desired, to provide two (or more) separate shader programs for execution by the programmable execution unit, e.g. one consisting of the normal complete shader program, and one consisting, e.g. only, of the appropriate "fused" instruction or instructions, with the, e.g., thread spawner, then selecting which version of the shader program should be executed for a given graphics entity (e.g. fragment) appropriately.

As will be appreciated by those skilled in the art, the graphics processing unit of the technology described herein will be part of an overall graphics processing system that will include, e.g., and in an embodiment, a host processor that, e.g., executes applications that require graphics processing by the graphics processing unit. The host processor will send appropriate commands and data to the graphics processing unit to control it to perform graphics processing operations and to produce graphics processing (render) output required by applications executing on the host processor. To facilitate this, the host processor should, and in an embodiment does, also execute a driver for the graphics processing unit and a compiler or compilers for compiling shader programs to be executed by the programmable execution unit of the graphics processing unit.

Although the compiler in an embodiment runs on a host processor of the overall data processing system that includes the graphics processing pipeline (with the graphics processing pipeline then being on another processor, such as a graphics processor, that is associated with the host processor (such that the compiler and compiled code run on separate processors within the overall data graphics processing system)), other arrangements would be possible. For example the compiler could run on the same processor as the compiled code, or the compiler could be run on a (completely) separate processor, such as the program being precompiled on a separate system and being distributed in a compiled form.

The graphics processing unit may also comprise, and/or be in communication with, one or more memories and/or memory devices that store the data described herein, and/or the output data generated by the graphics processing unit, and/or store software for performing the processes described herein. The graphics processing unit may also be in communication with a host microprocessor, and/or with a display for displaying images based on the data generated by the graphics processing unit.

As well as the processing stages discussed above, the graphics processing unit and pipeline may also contain any other suitable and desired processing stages that a graphics processing pipeline may contain such as an early depth (or an early depth and stencil) tester, a late depth (or depth and stencil) tester, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

The technology described herein is applicable to any suitable form or configuration of graphics processor. It is particularly applicable to tile-based graphics processors and graphics processing systems. Thus in an embodiment, the graphics processing system and graphics processing unit are a tile-based system and unit, respectively.

In an embodiment, the various functions of the technology described herein are carried out on a single graphics processing platform that generates and outputs the rendered fragment data that is, e.g., written to the frame buffer for the display device.

Although the technology described herein has been described above with particular reference to the execution of shader programs in graphics processing units, the Applicants have recognised and believe that the operation in the manner of the technology described herein and the techniques of the technology described herein may be equally applicable to and can be used in other, e.g. and in an embodiment multi-threaded, processing units and not just graphics processing units. They, for example, be applied appropriately to more general processors, such as CPUs (Central Processing Units), if desired.

Thus, another embodiment of the technology described herein comprises a processing unit comprising:
a programmable execution unit operable to execute programs to perform processing operations; and
a plurality of accelerators each operable to perform respective processing operations; wherein:
the programmable execution unit is operable to communicate with the accelerators to cause the accelerators to perform processing operations, and to receive responses from the accelerators; and further wherein:

two or more of the accelerators are operable to communicate directly with each other, in order to trigger processing operations by at least one of the accelerators.

Another embodiment of the technology described herein comprises a processing unit comprising:

a programmable execution unit operable to execute programs to perform processing operations; and a plurality of accelerators each operable to perform respective processing operations; and processing circuitry operable to receive processing entities to be processed, and to, for a processing entity to be processed, spawn an execution thread or threads for execution by the programmable execution unit, and/or issue a message directly to one or more of the accelerators, in order to trigger processing operations for the entity or entities.

Another embodiment of the technology described herein comprises a method of performing processing operations in a processing unit that comprises:

a programmable execution unit operable to execute programs to perform processing operations; and a plurality of accelerators each operable to perform respective processing operations; and in which:

the programmable execution unit is operable to communicate with the accelerators to cause the accelerators to perform processing operations, and to receive responses from the accelerators;

the method comprising:

one of the accelerators communicating directly with another one of the accelerators, in order to trigger processing operations by the another one of the accelerators.

Another embodiment of the technology described herein comprises a method of performing processing operations in a processing unit that comprises:

a programmable execution unit operable to execute programs to perform processing operations; and a plurality of accelerators each operable to perform respective processing operations;

the method comprising:

determining for a processing entity to be processed, whether to spawn an execution thread or threads for execution by the programmable execution unit, and/or to issue a message directly to one or more of the accelerators, in order to trigger processing operations for the processing entity; and spawning an execution thread or threads for execution by the programmable execution unit, and/or issuing a message directly to one or more of the accelerators, in order to trigger processing operations for the processing entity, in response to the determination.

As will be appreciated by those skilled in the art, these embodiments of the technology described herein can and in an embodiment do include any one or more or all of the features of the technology described herein, as appropriate.

In these embodiments of the technology described herein, the processing unit can be any suitable processing unit, such as a CPU, or a GPU. The accelerators can correspondingly be any suitable and desired accelerator, e.g. special purpose accelerator, that is operable to perform a given processing operation or operations.

In an example, one or more accelerators could be used in a network processor. The network processor could be implemented with a multi-threaded programmable unit system surrounded, for example, by a number of varying latency accelerators (e.g. CAM, encryption block etc.). In this case, work could be scheduled by assigning every IP packet (or group of IP packets) to a thread that in turn will generate messages to interact with the accelerator(s). Alternatively, the accelerator(s) could be called prior to the processing (in this case, what is needed would have to be known in order to call the accelerator).

Correspondingly, the processing entities that are being processed can be any suitable and desired processing entity, such as a work item that is to be processed.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, the programmable execution unit of the technology described herein may be embodied as programmable execution processing circuitry and/or any one or more or all of the accelerators of the technology described herein may be embodied as accelerator processing circuitry, e.g., in the form of one or more fixed-function units (hardware) (processing circuitry), and/or in the form of programmable processing circuitry that can be programmed to perform the desired operation. Equally, any one or more of the programmable execution unit, programmable execution processing circuitry, accelerators and accelerator processing circuitry of the technology described herein may comprise a separate circuit element, and/or may be at least partially formed of shared processing circuitry. Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described aspects and embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

Figures 2, 3:
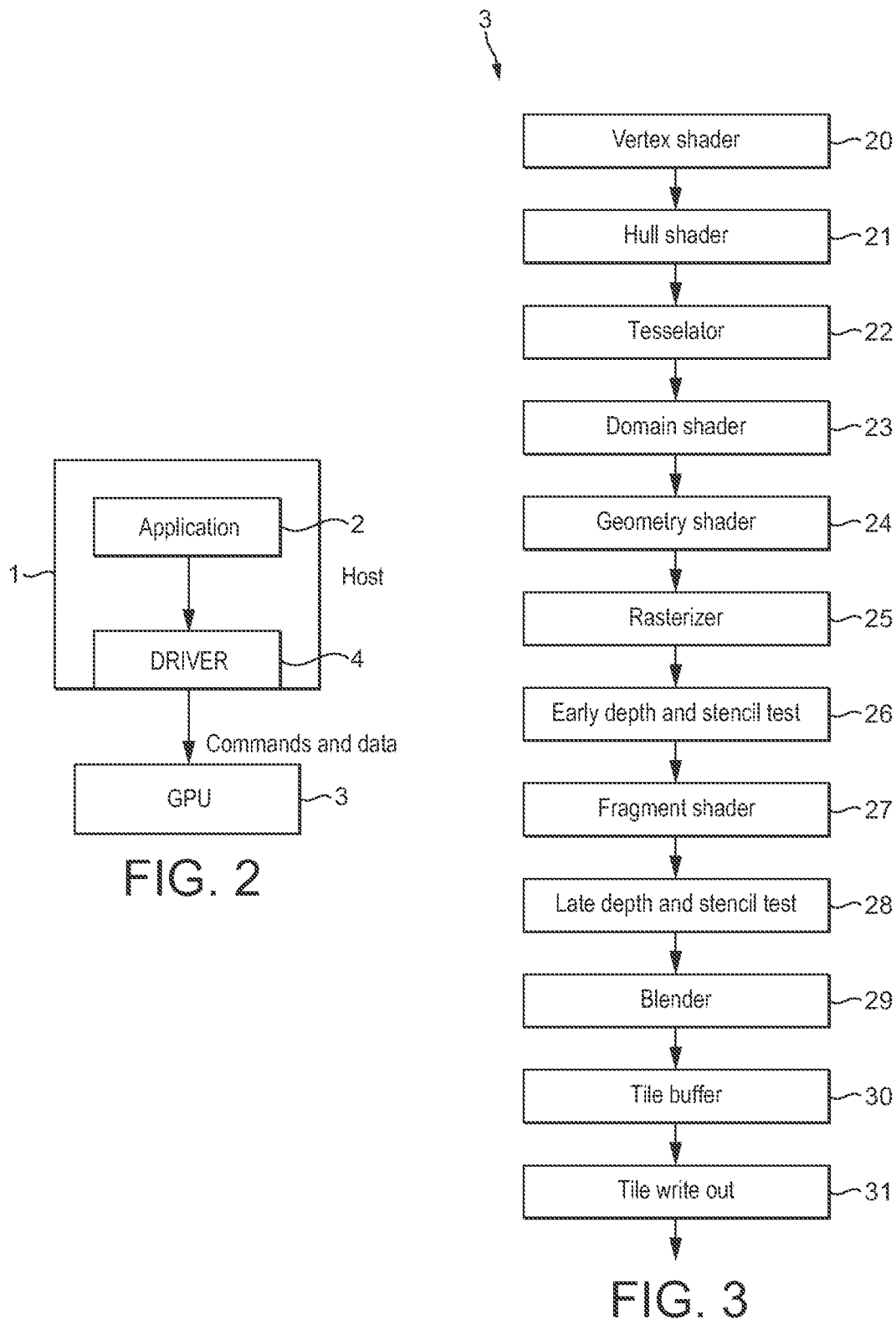
FIG. 2 shows an exemplary computer graphics processing system.
FIG. 3 shows schematically a graphics processing pipeline that can be operated in the manner of the technology described herein.

FIG. 2 shows a typical computer graphics processing system.

An application 2, such as a game, executing on a host processor 1 will require graphics processing operations to be performed by an associated graphics pipeline that is implemented by means of a graphics processing unit (GPU) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 3 shows the graphics processing pipeline 3 in more detail.

The graphics processing pipeline 3 shown in FIG. 3 is a tile-based renderer and will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may typically be an output frame intended for display on a display device, such as a screen or printer, but may also, for example, comprise intermediate data intended for use in later rendering passes (also known as a "render to texture" output), etc.

(When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 3 shows the main elements and pipeline stages of the graphics processing pipeline 3 that are relevant to the operation of the present embodiments. As will be appreciated by those skilled in the art there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processing pipeline as shown in FIG. 3 may be implemented as desired and will accordingly comprise, e.g., appropriate circuitry and/or processing logic, etc., for performing the necessary operation and functions.

As shown in FIG. 3, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20 takes the input data values associated with the vertices, etc., defined for the output to be generated, and processes those data values to generate a set of corresponding "vertex shaded" output data values for use by subsequent stages of the graphics processing pipeline 3.

The vertex shading, for example, modifies the input data to take account of the effect of lighting in the image to be rendered.

The hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer stores colour and depth buffers that store an appropriate colour, etc., or Z-value, respectively, for each sampling point that the buffers represent (in essence for each sampling point of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

As can be seen from FIG. 3, the graphics processing pipeline 3 includes a number of programmable processing or "shader" stages, namely the vertex shader 20, hull shader 21, domain shader 23, geometry shader 24, and the fragment shader 27. These programmable shader stages execute respective shader programs that have one or more input variables and generate sets of output variables and that are provided by the application.

To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application).

FIG. 3 shows schematically the operation stages of the graphics processing unit 3.

Figure 4:
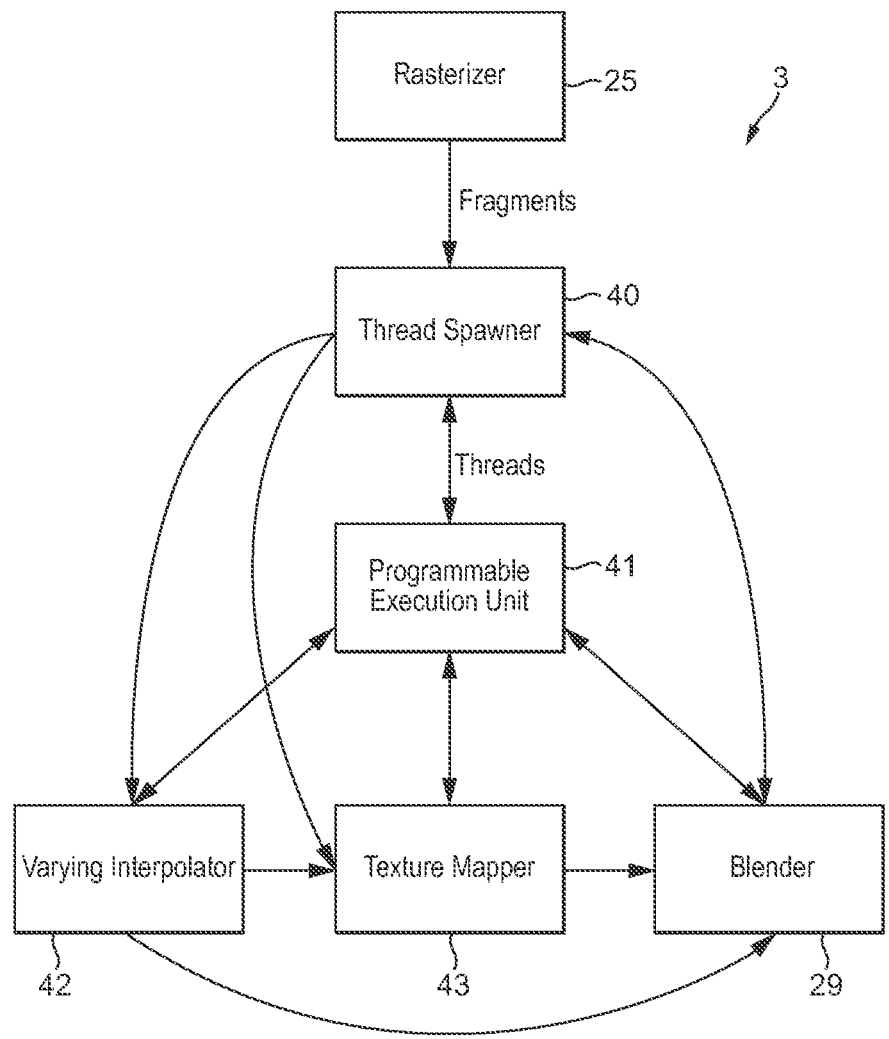
FIG. 4 shows schematically an embodiment of a graphics processing unit.

FIG. 4 shows the corresponding functional units of the graphics processing unit 3 that are used to perform (and thus to act as) various ones of the processing operations and stages of the graphics processing pipeline shown in FIG. 3 and that are relevant to the technology described herein. (There may be other functional units in the graphics processing unit 3. FIG. 4 shows those functional units that are relevant to operation in the manner of the technology described herein only for simplicity.)

As shown in FIG. 4, the graphics processing unit 3 includes a rasteriser 25, a thread spawner 40, a programmable execution unit 41, a varying interpolator 42, a texture mapper 43, and a blender 29.

The thread spawner 40 is operable to spawn execution threads for execution by the programmable execution unit 41 for fragments that it receives.

The programmable execution unit 41 operates to execute shader programs to perform the shader operations of the graphics processing pipeline, such as the hull shader, the vertex shader and the fragment shader. To do this, it receives execution threads from the thread spawner 40 and executes the relevant shader program for those execution threads.

The varying interpolator 42 operates to interpolate values across graphics primitives, and, as part of this operation, often creates texture coordinates to be used for sampling graphics textures.

The texture mapper 43 operates to sample graphics textures using texture coordinates, e.g. generated by the varying interpolator 42, and produces therefrom a filtered texture sample result.

The blender 29 operates to blend, e.g., fragment shading results generated by the programmable execution unit with previously generated fragment shader results, such as results that are already stored in the tile buffer.

As shown in FIG. 4, as well as the programmable execution unit 41 being able to communicate with the varying interpolator 42, the texture mapper 43 and the blender 29, those graphics-specific accelerators are also able to communicate directly with each other. Furthermore, as also shown in FIG. 4, the thread spawner 40 is also able to communicate directly with the varying interpolator 42, the texture mapper 43 and the blender 29, independently of the programmable execution unit 41. These additional communications links are used in embodiments of the technology described herein to perform graphics processing operations more efficiently.

In particular, and as discussed above, the Applicants have recognised that for certain graphics processing operations that are required by shader programs, it would be possible to perform those graphics processing operations by using direct communication between graphics-specific accelerators of the graphics processing unit, instead of executing instructions in the programmable execution unit to trigger the performance of those operations by the graphics-specific accelerators.

Figure 6:
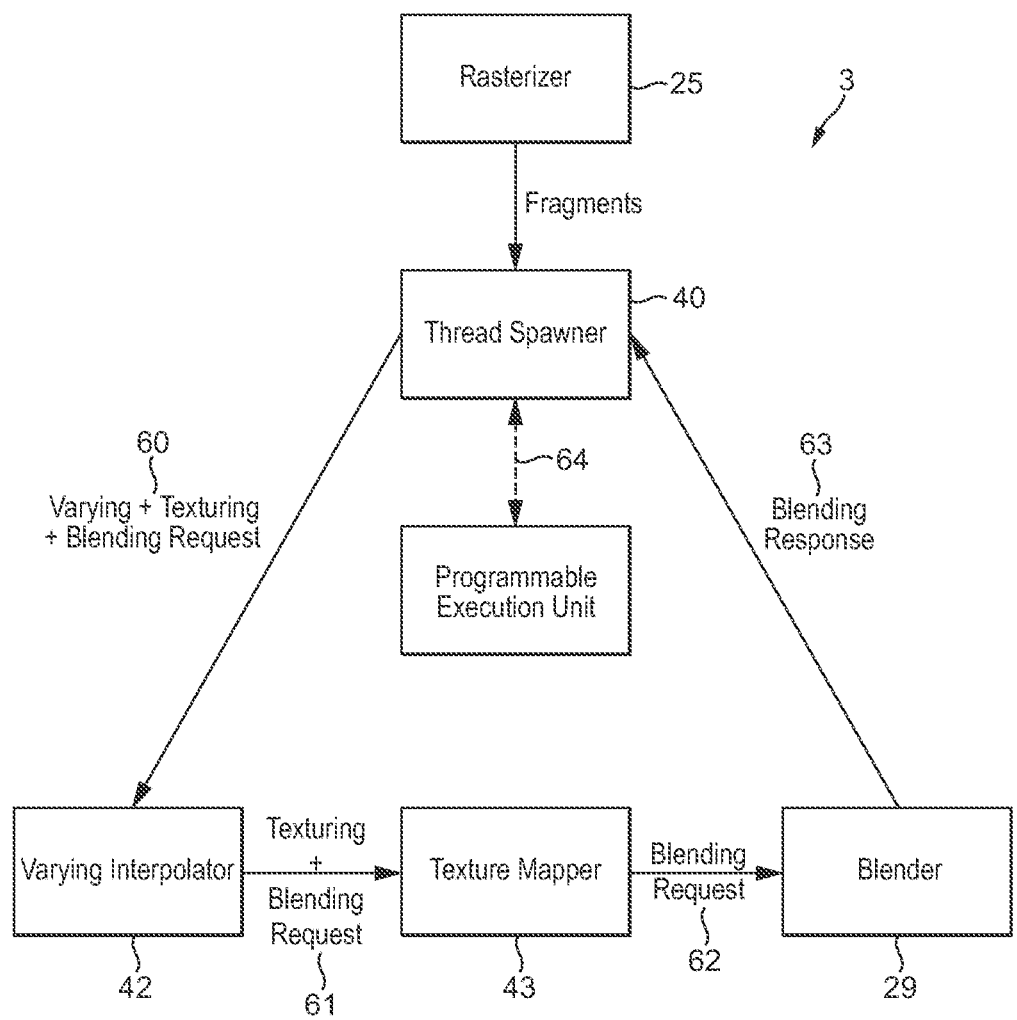
Figure 8:
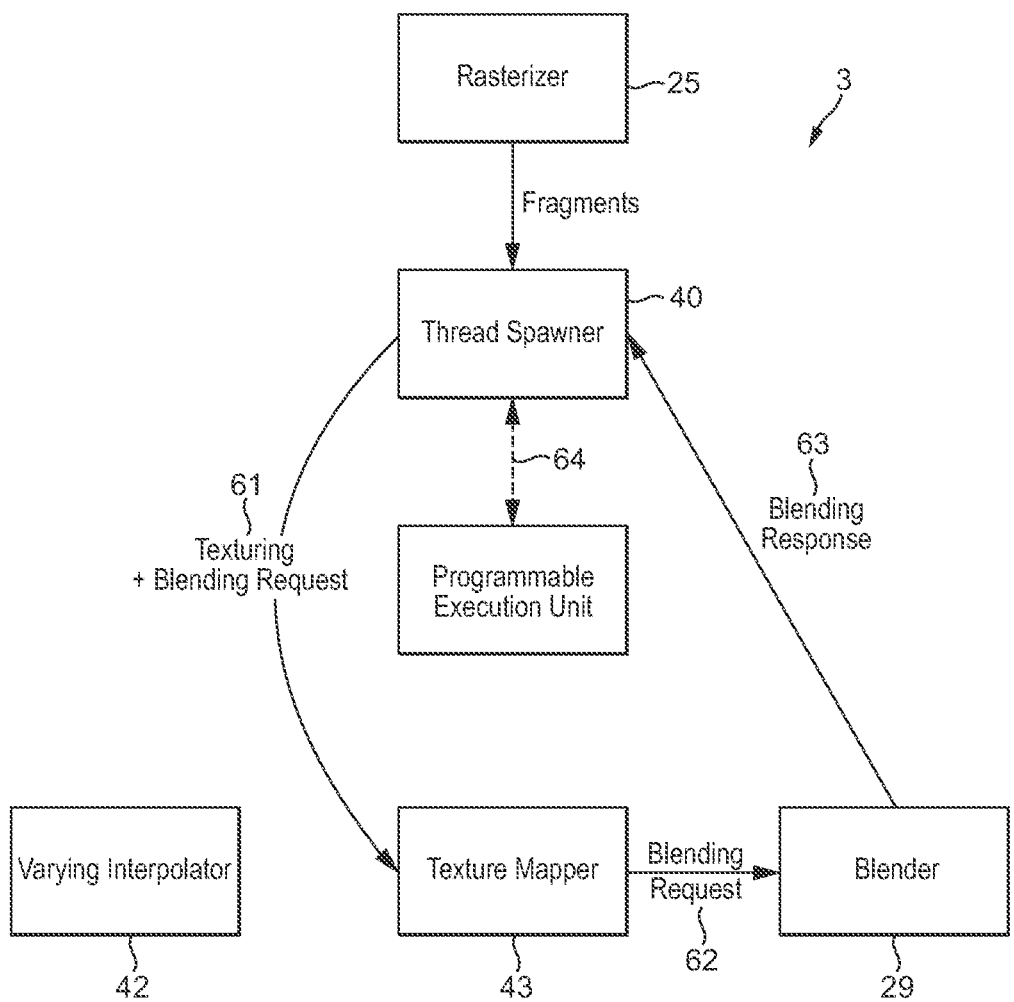
Figure 9:
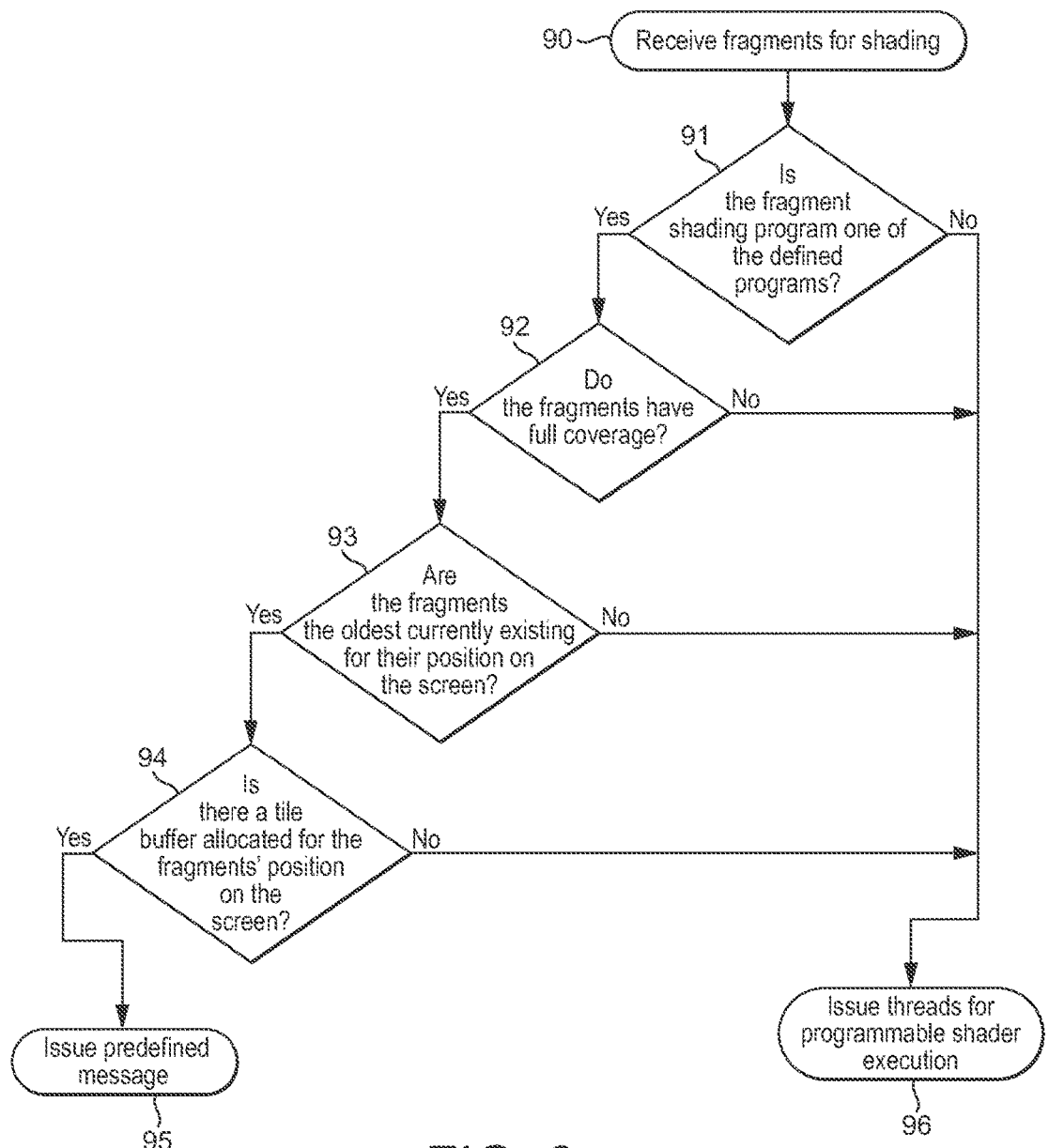
FIG. 9 shows schematically the operation of the thread spawner in the first and second embodiments of the technology described herein.

FIGS. 5-9 show two embodiments of this operation. FIGS. 5 and 6 show a first embodiment of this operation, and FIGS. 7 and 8 show a second embodiment. FIG. 9 shows schematically the operation of the thread spawner in these embodiments.

FIG. 5 shows an exemplary fragment shader program that requires varying interpolation, a texture lookup using the coordinates produced by the varying interpolation operation, and a blending operation using the so-sampled texture. The Applicants have recognised that this form of shader program, which may typically be used for most user interface composition, blitting and very often in simple games like Angry Birds, is suitable for performance by means of direct communication between the graphics-specific accelerators (and in particular the varying interpolator 42, the texture mapper 43 and the blender 29 of the graphics processing unit), independently of the programmable execution unit 41.

The shader program compiler for the graphics processing unit 3 is configured to be able to recognise this particular shader program. When it identifies that this shader program is to be executed, it informs the driver for the graphics processing unit. It also outputs the normal compiled shader program binary.

The driver 4 then encodes in a suitable data structure that the shader program has been identified as being the particular shader program in question. It also encodes the shader binary program as normal and provides it to the graphics processing unit 3.

FIG. 6 shows the corresponding operation of the graphics processing unit 3.

As shown in FIG. 6, the graphics processing unit 3, when it is to execute the shader program, will rasterise graphics primitives to generate fragments and provide those fragments to the thread spawner 40.

However, when the thread spawner 40 receives the fragments for fragment shading, rather than simply issuing corresponding threads to the programmable execution unit 41, it identifies (from the indication provided by the driver) that the fragment shader program is of a form that can be executed by direct communication between the graphics-specific accelerators of the graphics processing unit. Then, for each fragment that it receives for processing, it determines whether the fragment meets a set of conditions that mean that the fragment can be processed by means of direct communication between the graphics-specific accelerators. (This determination and the relevant fragment conditions will be discussed in relation to FIG. 9 in more detail below.)

In the event that the thread spawner 40 determines that the graphics processing operations can be performed for the fragment in question by means of direct communication between the graphics-specific accelerators, then, as shown in FIG. 6, rather than issuing threads to the programmable execution unit 41 to execute the shader program for the fragment, the thread spawner 40 instead issues a combined varying+texturing+blending request message 60 directly to the varying interpolator 42.

In response to this, the varying interpolator 42 performs the relevant attribute interpolation operation, and then sends a texturing+blending request message 61 directly to the texture mapper 43.

In response to this, the texture mapper 43 performs the texture lookup using the coordinates provided by the varying interpolator, and then sends a blending request message 62 directly to the blender 29.

The blender 29 then performs its blending operation using the sampled texture values and returns the blending response 63 directly to the thread spawner 40.

As can be seen, in this sequence of operations, at no point is the programmable execution unit involved. (The work done in the graphics-specific accelerators is unchanged.)

On the other hand, if the fragment does not meet the conditions for processing in the above manner, then the thread spawner 40 simply issues execution threads 64 for the fragment to the programmable execution unit and the fragment is processed by executing the shader program in the programmable execution unit 41 in the normal manner.

It can be seen from FIG. 6, that where a fragment can be processed by means of direct communication with and between the graphics-specific accelerators, that operation avoids the relevant operations in the programmable execution unit for performing the graphics processing operations, and thus removes the need, e.g., to create a fragment shader thread and initialise it, and fetch, decode and execute three instructions, before terminating the thread. This saves power, and in some cases may allow the clock to one or more programmable execution units to be stopped entirely.

The Applicants have found that this particular message sequence can remove the need for spawning threads for more than 90% of fragments when running simple blitting content (with a corresponding reduction in the number of executed instructions).

FIG. 7 shows two further exemplary fragment shader programs that can be performed using direct communication between the graphics-specific accelerators of the graphics processing unit. The first shader program 70 shown in FIG. 7 uses the texture mapper to sample and output depth/stencil values, and the second shader program 71 uses the texture mapper to sample and output colour values. These fragment shaders use the integer coordinates of the fragment in question to perform texture sampling (and thus do not, e.g., require any varying interpolation operations). These shader programs may be used, for example, for preloading tile buffer content when doing multi-pass rendering.

FIG. 8 shows the operation of an embodiment of the technology described herein when using direct communication with and between the graphics-specific accelerators (and in particular the texture mapper and blender) to perform the operations of the second shader program 71 shown in FIG. 7.

Thus, as shown in FIG. 8, when the thread spawner 40 receives fragments for processing, it will recognise from the indication provided by the driver that the shader program to be executed for the fragments is of the form shown in FIG. 7, and then determine whether a given fragment to be processed meets the conditions for performing the processing operations for the shader program independently of the programmable execution unit (i.e. without actually executing the shader program).

If the thread spawner determines that the fragment can be processed in this way, then as shown in FIG. 8, it will issue a texturing+blending request message 61 directly to the texture mapper 43, which will then perform a texture lookup in response thereto, and then send a blending request message 62 together with the sampled texture values to the blender 29, which will then blend the values received from the texture mapper into the desired output data array (e.g. tile buffer) accordingly.

(Again, if the thread spawner 40 determines for a given fragment that the graphics processing operations cannot be performed using the direct communication arrangement shown in FIG. 8, then instead it will spawn and issue execution threads 64 to the programmable execution unit 41 for execution of the shader program in the normal manner for the fragment in question.)

FIG. 9 shows in more detail the operation of the thread spawner to determine whether to process a fragment that it has received for fragment shading by issuing messages directly to the relevant graphics-specific accelerator or accelerators of the graphics processing unit, or by issuing threads to the programmable execution unit for shader program execution in the normal manner.

As shown in FIG. 9, in the present embodiments, once the thread spawner has received a fragment for shading 90 it first determines whether the fragment shading program to be executed for the fragment is one of the programs that have been predefined as being able to be replaced by use of messages and direct communication between the graphics-specific accelerators of the graphics processing unit (step 91).

In the event that the thread spawner determines that the fragment shading program is not one of these predefined programs, it simply issues threads for programmable shader execution to the programmable execution unit in the normal manner (step 96).

On the other hand, if it is determined that the fragment shading program is one of the defined programs that are suitable for replacing with direct messaging and communication between the graphics-specific accelerators of the graphics processing unit, then the thread spawner determines whether the fragment or fragments to be processed have full coverage (i.e. whether the primitive in question completely covers all the sampling points of the set of sampling points that the fragment or fragments represents) (step 92). This condition is used because if the fragments do not have full coverage, then some form of coverage information would need to be retained for the fragments, and this may be more straightforward for the programmable execution unit to do.

If it is determined that the fragments do not have full coverage, then the thread spawner issues threads for programmable shader execution in the normal way (step 96).

If the fragments are determined to have full coverage in step 92, then the thread spawner determines whether the fragment or fragments in question are the oldest currently existing for their position in the render output (e.g. on the screen) (step 93). Again, if it is determined that the fragments are not the oldest currently existing for their position in the render output, then the thread spawner issues threads for programmable shader execution (step 96).

This condition is used because again if the fragments were not the oldest currently existing for their position in the render output, then some form of dependency mechanism for the age of the fragments may be required, and it may be more straightforward for that to be performed in the programmable execution unit.

If it is determined at step 93 that the fragment or fragments are the oldest currently existing for their position in the render output, the thread spawner then determines whether there is a tile buffer allocated for the fragment's position in the render output (step 94). Again, if it is determined that there isn't a tile buffer allocated for the fragment's position in the render output, then the thread spawner issues threads for programmable shader execution (step 96).

This condition is again used because if the fragments do not have an allocated tile buffer, then some form of dependency mechanism that controls the allocation and use of the tile buffers would be required, and it may be more straightforward for the programmable execution unit to handle that.

On the other hand, if it is determined at step 94 that there is a tile buffer allocated for the fragment's position in the render output, then the fragment or fragments in question have met all the conditions for processing the fragment using direct communication between the graphics-specific accelerators independent of the programmable execution unit, and so the thread spawner instead issues the relevant predefined message (e.g. the varying+texturing+blending message or the texturing+blending message) directly to the appropriate graphics-specific accelerator (step 95).

This can then be repeated for the next fragment to be processed, and so on, until all the fragments to be processed for the shading program in question have been processed.

It would be possible to include other or more or fewer conditions to those shown in FIG. 9, for example depending upon the functionality that is available in the graphics-specific accelerators and/or the amount of information that it is desired to pass directly between the graphics-specific accelerators. A further condition could, for example, relate to whether particular tests, such as alpha tests or alpha-to-coverage tests, or any other "complicating" features, are enabled for the fragment or fragments in question. (As in that case it may again be preferable to execute those tests, etc., in the programmable execution unit.)

Figure 10:
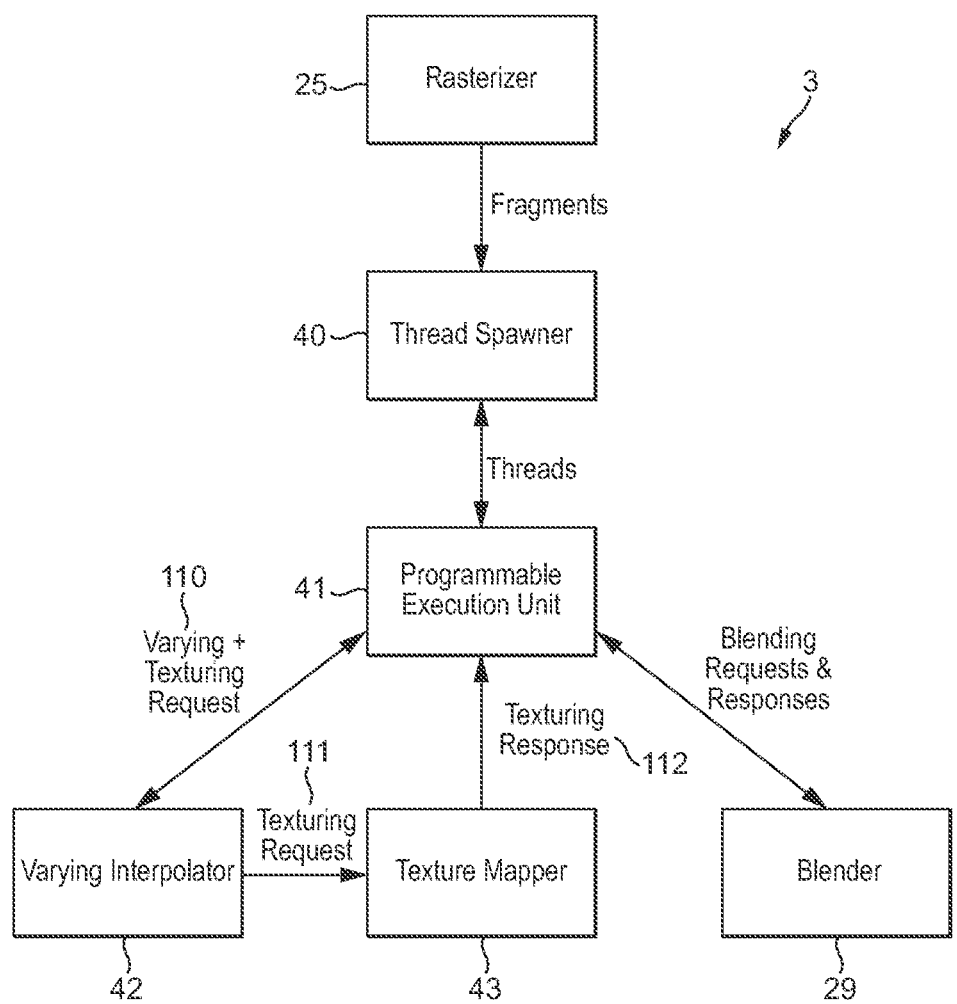
FIGS. 10 and 11 show schematically a third embodiment of the technology described herein.
Figure 11:
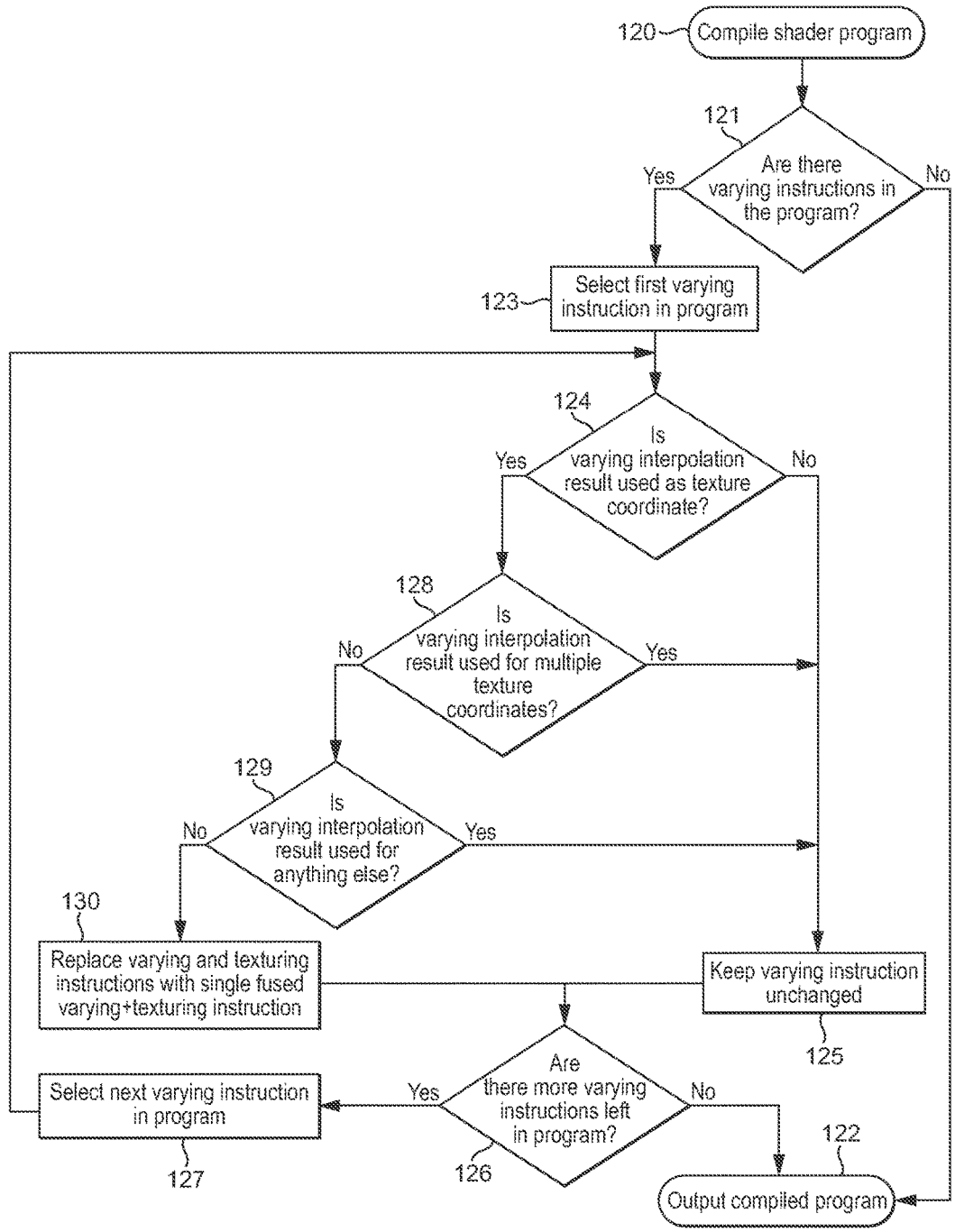

FIGS. 10 and 11 shows a further embodiment of the technology described herein in which the operation by means of direct communication between the graphics-specific accelerators of the graphics processing unit is triggered by means of a message sent by the programmable execution unit. In this embodiment, appropriate instructions to cause the programmable execution unit to issue such a message to the graphics-specific accelerators of the graphics processing unit to trigger this operation are included in a shader program to be executed by the programmable execution unit by the compiler for the shader program.

FIG. 10 shows the operation of the programmable execution unit when it executes such an instruction, and FIG. 11 shows the compiler operation for including such instructions in a shader program to be executed by the programmable execution unit.

In this embodiment, the operation that is performed by the programmable execution unit triggering direct communication between graphics-specific accelerators of the graphics processing unit is varying interpolation followed by a texture lookup using the coordinates derived by the varying interpolation operation. Other arrangements would, of course, be possible.

As shown in FIG. 10, when the programmable execution unit 41, when executing a shader program, encounters (executes) a combined varying+texturing instruction, it issues a varying+texturing request message 110 to the varying interpolator 42.

The varying+texturing request message 110 contains the (minimum amount of) information for performing both the varying interpolation operation and the following texture operation. In a system with multiple execution units, it also contains information about the original sender, i.e. the execution unit from which the request originated.

As shown in FIG. 10, the varying interpolator 42 receives the varying+texturing request message 110 and in response thereto does the varying calculation. However, instead of returning the results to the programmable execution unit 41, the varying interpolator (at some later point) forwards a texturing request message 111 to the texture mapper. This message 111 includes the result of the varying calculation together with the relevant data from the original varying+texturing request message, such as the texture operation, and which texture-to-lookup (and, where appropriate, which execution unit to return the data to).

The texture mapper treats the message 111 from the varying interpolator 42 as a normal texture operation request and accordingly does its texture operations, using the data from the varying+texturing request message and the varying interpolator and returns the resulting texture data (the texturing response) 112 to the programmable execution unit 41 appropriately.

The programmable execution unit may then use the returned texturing data for further graphics processing operations, e.g. when executing further instructions in the shader program.

In this arrangement, rather than the programmable execution unit 41 having to issue separate varying requests and texturing requests to the varying interpolator 42 and the texture mapper 43, respectively (which would require the execution of at least two instructions in the programmable execution unit), instead a single instruction in the programmable execution unit triggers the sending of a combined varying+texturing request message 110 that triggers the varying interpolation and texture mapping operations without further input being required from the programmable execution unit.

As discussed above, in this embodiment, the compiler for the shader program determines whether to include an instruction to trigger the sending of the combined varying+texturing request message in the shader program or not. An embodiment of this compiler operation is shown in FIG. 11.

As shown in FIG. 11, at the start of the compilation process for the shader program 120, the shader compiler first determines whether there are any varying instructions in the shader program (step 121). If there are no varying instructions in the shader program, then the compiler outputs the "normal" version of the compiled program (step 122).

On the other hand, if there are varying instructions in the shader program, then the first varying instruction in the program is selected (step 123). It is then determined whether the varying interpolation result is used as a texture coordinate (step 124). If the varying instruction result is not used as a texture coordinate, then the varying instruction is kept unchanged (step 125) and the process moves to the next varying instruction (if any) or the compiled program is output (steps 126, 127 and 122).

On the other hand, if it is determined at step 124 that the varying interpolation result is used as a texture coordinate, it is then determined whether the varying interpolation result is used for multiple texture coordinates (step 128).

If the varying interpolation result is used for multiple texture coordinates, then the varying instruction is kept unchanged (step 125) and either the compiled program is output or the next varying instruction in the program is considered (steps 122, 126 and 127).

If the varying interpolation result is not used for multiple texture coordinates, it is then determined whether the varying interpolation result is used for anything else (step 129).

If it is determined that the varying interpolation result is used for something else, then the varying instruction is kept unchanged (step 125) and either the compiled program is output or the next varying instruction is selected for consideration (steps 126, 122 and 127).

If it is determined at step 129 that the varying interpolation result is not used for anything else, (i.e. in other words the varying interpolation result is simply used as a single texture coordinate), then the varying and corresponding texturing instructions are replaced in the compiled shader program with a single combined (fused) varying+texturing instruction (step 130) that will accordingly when executed trigger the sending of a varying and texturing request message 110 to the varying interpolator by the programmable execution unit as shown in FIG. 10.

It is then again considered whether there are any more varying instructions left in the program (step 126), and if there are, the next varying instructions in the program is selected for processing (step 127), or if not, the compiled program is output (step 122).

In this way, the compiler can identify appropriate opportunities within a shader program for replacing separate varying and texturing instructions with a single combined (fused) varying+texturing instruction.

Other arrangements would, of course, be possible.

Figure 12:
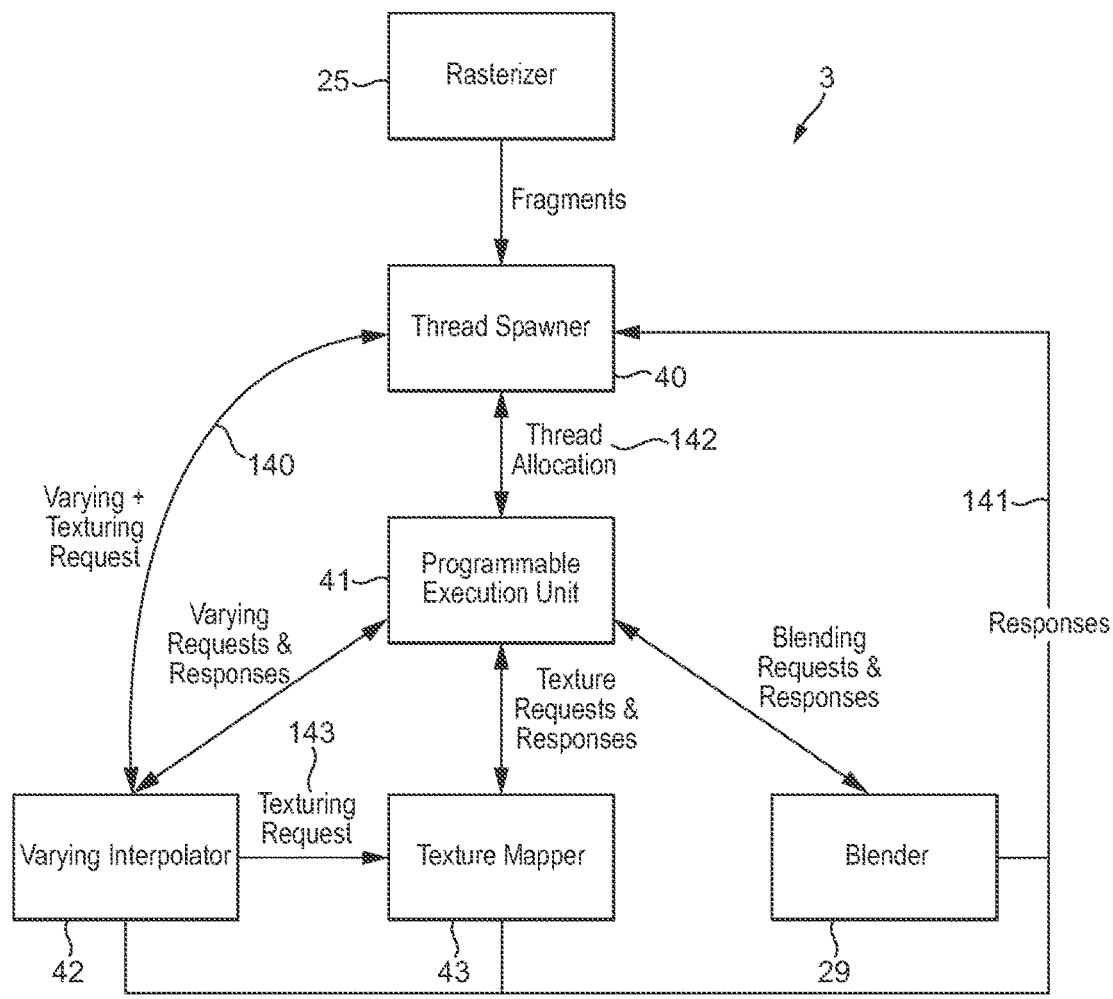
FIGS. 12 and 13 show schematically a fourth embodiment of the technology described herein.
Figure 13:
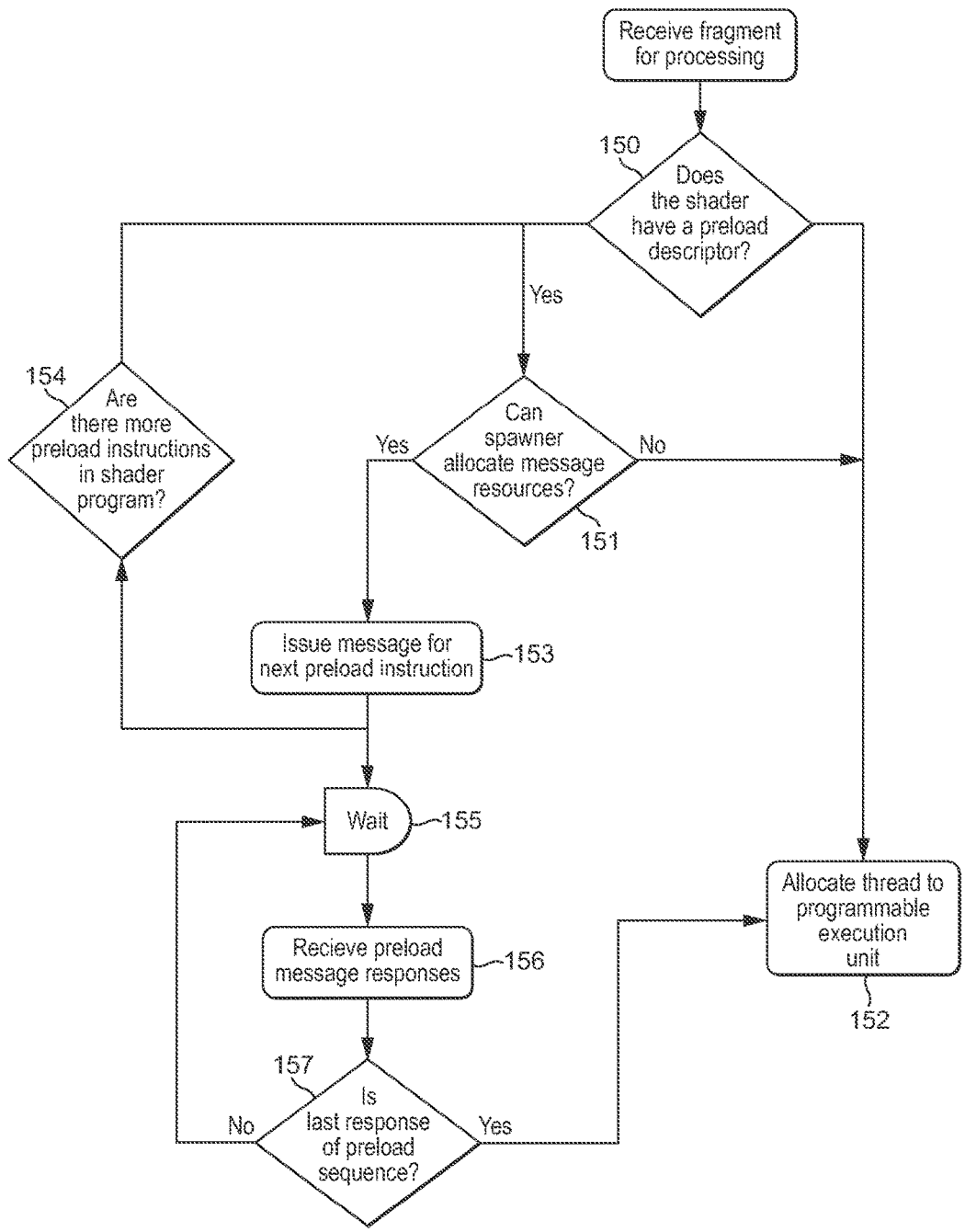

FIGS. 12 and 13 show a further embodiment of the technology described herein in which the graphics fragments are processed both by means of messages that trigger direct communication between graphics-specific accelerators of the graphics processing unit, and by executing a shader program for the graphics fragments.

FIG. 12 shows the operation of the graphics processing unit in this arrangement. FIG. 13 shows the operation of the thread spawner in this embodiment in more detail.

In this embodiment, it is assumed that the shader program to be executed for the graphics fragments includes initial varying and texturing instructions that are used to "preload" data from a texture for use when processing the graphics fragments. In this embodiment, rather than performing this "preload" operation by means of the programmable execution unit 41 executing appropriate instructions and sending appropriate varying and texturing request messages to the varying interpolator 42 and the texture mapper 43, the thread spawner 40 instead (where it is possible to do this) first sends a varying+texturing request message 140 directly to the varying interpolator 42 to trigger the performing of the texture "preload" by means of direct communication between the varying interpolator 42 and the texture mapper 43.

Thus, as shown in FIG. 12, when a graphics fragment (graphics entity) is processed, the thread spawner 40 first issues a combined varying+texturing request message 140 directly to the varying interpolator 42.

In response to this, the varying interpolator 42 performs the relevant attribute interpolation operation, and then sends a texturing request message 143 directly to the texture mapper 43. In response to this, the texture mapper 43 performs a texture lookup using the coordinates provided by the varying interpolator, and then returns its results 141 to the thread spawner 40. The results may, e.g., be stored in registers that have been allocated for this purpose.

Once the texture mapper 43 has returned its result 141 to the thread spawner 40, the thread spawner 40 then issues an execution thread 142 to the programmable execution unit 41 to trigger further processing of the fragment by execution of a shader program.

The programmable execution unit then executes the shader program for the thread (and thus for the fragment) in the normal manner, using the results returned by the "preload" operation that was performed by means of direct communication between the varying interpolator 42 and the texture mapper 43.

Thus, in this arrangement, rather than either processing a fragment by the thread spawner 40 issuing a message directly to one of the graphics-specific accelerators to trigger processing by means of direct communication between the graphics-specific accelerators, or issuing an execution thread to the programmable execution unit 41 to process a fragment, the thread spawner is operable to both issue a message directly to one of the graphics-specific accelerators and to issue an execution thread to the programmable execution unit 41, i.e. such that the graphics fragment will be processed both by triggering direct communication between the graphics-specific accelerators and by executing a shader program in the programmable execution unit.

FIG. 13 shows the operation of the thread spawner 40 in this embodiment in more detail.

As shown in FIG. 13, when the thread spawner 40 receives a fragment for processing, it first determines whether the shader program that is to be executed for the fragment is identified as being a shader program for which "preload" messages can be sent instead of executing "preload" instructions in the shader program (step 150). To facilitate this operation, each shader program has a corresponding shader descriptor that indicates, inter alia, whether the shader program includes any "preload" instructions, and, if so, which instructions are the "preload" instructions, and corresponding messages that can be sent directly by the thread spawner to the graphics-specific accelerators to perform the relevant preload operations.

If the thread spawner determines at step 150 that the shader program for the graphics fragment does include preload instructions, the thread spawner then determines whether appropriate resources, such as registers, needed for performing the preload operations by means of sending a message directly to one of the graphics-specific accelerators are available or not (step 151).

As shown in FIG. 13, if at step 150 it is determined that the shader does not include preload operations, or if at step 151 it is determined that appropriate resources for sending a message directly to one of the graphics-specific accelerators are not available, then the thread spawner simply directly allocates a thread to the programmable execution unit (step 152) to process the graphics fragment.

On the other hand, if it is determined at step 151 that appropriate resources, such as registers needed for storing the results of the processing operations to be performed by means of direct communication between the graphics-specific accelerators, are available, then the thread spawner sends a message directly to the appropriate graphics-specific accelerator (step 153) to perform the "preload" operation by means of direct communication between the graphics-specific accelerators (step 153).

This is then repeated for each preload instruction that the shader program is indicated as containing (step 154).

Once all the preload instructions in the shader program have been considered and appropriate messages issued by the thread spawner directly to the appropriate graphics-specific accelerators to perform the corresponding preload operations (where appropriate resources are available for those messages), the thread spawner then waits until it has received all the required responses for the processing operations that were triggered by the sending of the "preload" messages directly to the graphics-specific accelerators (steps 155, 156 and 157).

Once the thread spawner has received all the responses from the preload operations that it sent messages directly to a graphics-specific accelerator to trigger, then the thread spawner issues an execution thread to the programmable execution unit (step 152) to perform the remaining processing for the graphics fragment.

At this stage the thread spawner will also allocate appropriate resources, such as registers, to the thread. This then avoids those resources, such as registers, being allocated to an execution thread whilst the "preload" operations are being performed. In this way, the period for which thread resources are allocated (and thus unavailable for other use) can be reduced, as those resources are not, for example, allocated whilst the preload operations are being performed (instead a more limited set of resources, e.g. registers may be allocated for use by the graphics-specific accelerators whilst the preload operations are being performed).

The programmable execution unit 41 then executes the shader program for the execution thread. For this execution, the programmable execution unit executes those instructions in the shader program that perform operations that have not already been performed by means of the messages that were issued to trigger direct communication between the graphics-specific accelerators.

Thus where it was determined at steps 150 or 151 that it was not possible or appropriate to send any messages triggering direct communication between the graphics-specific accelerators, the programmable execution unit will simply execute the entire shader program for the execution thread for the fragment in question.

On the other hand, where one or more of the preload instructions in the shader program have been performed by means of sending a message directly to the relevant graphics-specific accelerators to perform those operations by means of direct communication between the graphics-specific accelerators, then the programmable execution unit will skip those preload instructions that have, in effect, already been performed, when it executes the shader program for the thread for the fragment in question. In this way, execution of instructions of a shader program for the programmable execution unit is replaced by issuing messages directly to graphics-specific accelerators to trigger the corresponding processing operations.

Other arrangements would, of course, be possible.

Although the present embodiments have been described above with particular reference to the execution of shader programs in graphics processing units, the operation in the manner of the technology described herein and the techniques of the technology described herein are equally applicable to and can be used in other processing units, such as a more general processor, such as a CPU (Central Processing Unit), if desired.

It can be seen from the above that the technology described herein, in its embodiments at least, facilitates more efficient performance of graphics processing operations. This is achieved, in the embodiments of the technology described herein at least, by using direct communication between graphics-specific accelerators of a graphics processing unit to trigger and perform graphics processing operations of those graphics-specific accelerators, instead of using separate communication from the programmable execution unit of the graphics processing unit with those graphics-specific accelerators to trigger and control the performance of the respective graphics processing operations.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A processing unit comprising:
a programmable execution unit operable to execute programs to perform processing operations; and
a plurality of accelerators each operable to perform respective processing operations; wherein:
the programmable execution unit is operable to communicate with the accelerators to cause the accelerators to perform processing operations, and to receive responses from the accelerators;
two or more of the accelerators are operable to communicate directly with each other, in order to trigger processing operations by at least one of the accelerators; and further wherein:
the processing unit is configured to determine for a processing entity or group of processing entities to be processed by the processing unit, whether that entity or group of entities should be processed solely by executing a program using the programmable execution unit for that entity or group of entities, or whether that entity or group of entities should be processed solely by means of direct communication between the accelerators, or whether that entity or group of entities should be processed both by executing a program using the programmable execution unit for that entity or group of entities and by means of direct communication between the accelerators; and
the processing unit comprises processing circuitry configured to:
when it is determined that a processing entity or entities is to be processed by executing a program using the programmable execution unit, issue an execution thread or threads for execution by the programmable execution unit in order to trigger processing operations for the entity or entities;
when it is determined that a processing entity or entities is to be processed by means of direct communication between the accelerators, issue a message directly to one or more of the accelerators, in order to trigger processing operations for the entity or entities; and
when it is determined that a processing entity or entities is to be processed both by executing a program using the programmable execution unit for the entity or group of entities and by means of direct communication between the accelerators, issue an execution thread or threads for execution by the programmable execution unit in order to trigger processing operations for the entity or entities, and issue a message directly to one or more of the accelerators, in order to trigger processing operations for the entity or entities.

2. The processing unit of claim 1, wherein:
the processing unit is a graphics processing unit;
the accelerators include a varying interpolator, a texture mapper and a blender; and
the varying interpolator can communicate directly with the texture mapper to request texturing operations, and/or the texture mapper can communicate directly with the blender to request blending operations.

3. The processing unit of claim 1, wherein there is a set of programs that are predefined as being suitable to be performed using direct communication between the accelerators.

4. The processing unit of claim 1, wherein:
the processing entity or entities comprise a graphics fragment or fragments; and
the determination is based on one or more of:
whether the fragment to be processed has full coverage;
whether the fragment to be processed has an allocated tile buffer; and
whether the fragment to be processed is the oldest at its position in the render output.

5. The processing unit of claim 1, wherein the programmable execution unit is operable to be able to issue a message or messages to one or more of the accelerators that will then cause the accelerators to communicate directly with each other to perform processing operations.

6. The processing unit of claim 5, wherein the programmable execution unit is operable to issue a message or messages to one or more of the accelerators that will then cause the accelerators to communicate directly with each other to perform processing operations in response to an instruction in a program that it is executing.

7. A method of performing processing operations in a processing unit that comprises:
- a programmable execution unit operable to execute programs to perform processing operations; and
- a plurality of accelerators each operable to perform respective processing operations; and in which:
- the programmable execution unit is operable to communicate with the accelerators to cause the accelerators to perform processing operations, and to receive responses from the accelerators; and
- two or more of the accelerators are operable to communicate directly with each other, in order to trigger processing operations by at least one of the accelerators;

the method comprising:
the processing unit:
- determining for a processing entity or group of processing entities to be processed by the processing unit, whether that entity or group of entities should be processed solely by executing a program using the programmable execution unit for that entity or group of entities, or whether that entity or group of entities should be processed solely by means of direct communication between the accelerators, or whether that entity or group of entities should be processed both by executing a program using the programmable execution unit for that entity or group of entities and by means of direct communication between the accelerators;
- when it is determined that a processing entity or entities is to be processed by executing a program using the programmable execution unit, issuing an execution thread or threads for execution to the programmable execution unit in order to trigger processing operations for the entity or entities;
- when it is determined that a processing entity or entities is to be processed by means of direct communication between the accelerators, issuing a message directly to one or more of the accelerators, in order to trigger processing operations for the entity or entities; and
- when it is determined that a processing entity or entities is to be processed, both by executing a program using the programmable execution unit for that entity or group of entities and by means of direct communication between the accelerators, issuing an execution thread or threads for execution to the programmable execution unit in order to trigger processing operations for the entity or entities, and issuing a message directly to one or more of the accelerators in order to trigger processing operations for the entity or entities.

8. The method of claim 7, wherein:
the processing unit is a graphics processing unit;
the accelerators include a varying interpolator, and a texture mapper; and
the method comprises:
the varying interpolator communicating directly with the texture mapper to request texturing operations.

9. The method of claim 7, wherein:
the processing unit is a graphics processing unit;
the accelerators include a texture mapper and a blender; and
the method comprises:
the texture mapper communicating directly with the blender to request blending operations.

10. The method of claim 7, wherein there is a set of programs that are predefined as being suitable to be performed using direct communication between the accelerators.

11. The method of claim 7, wherein:
the processing entity or entities comprise a graphics fragment or fragments; and
the determination is based on one or more of:
whether the fragment to be processed has full coverage;
whether the fragment to be processed has an allocated tile buffer; and
whether the fragment to be processed is the oldest at its position in the render output.

12. The method of claim 7, comprising the programmable execution unit issuing a message to one of the accelerators to cause that accelerator to communicate directly with another one of the accelerators.

13. The method of claim 7, comprising:
issuing to the programmable execution unit of the processing unit a program for execution by the programmable execution unit that includes an instruction to cause the programmable execution unit to issue a message to one of the accelerators to cause that accelerator to communicate directly with another one of the accelerators and to cause both accelerators to perform processing operations; and
the programmable execution unit when executing the program, when it reaches the instruction in the program, issuing a message to one of the accelerators to cause that accelerator to perform a processing operation or operations, and to then communicate directly with another of the accelerators to cause that accelerator to perform a processing operation.

14. The method of claim 7, comprising:
identifying in a program to be executed instructions that could be performed by the use of direct communication between the accelerators of the processing unit; and
when such a sequence of instructions is identified, replacing those instructions with an instruction that will cause the programmable execution unit to issue a message to one of the accelerators to trigger the performance of processing operations that the instructions relate to by means of direct communication between accelerators of the processing unit.

15. A non-transitory computer readable storage medium storing computer software code which when executing on a processor performs a method of performing processing operations in a processing unit that comprises:
- a programmable execution unit operable to execute programs to perform processing operations; and
- a plurality of accelerators each operable to perform respective processing operations; and in which:
- the programmable execution unit is operable to communicate with the accelerators to cause the accelerators to perform processing operations, and to receive responses from the accelerators; and
- two or more of the accelerators are operable to communicate directly with each other, in order to trigger processing operations by at least one of the accelerators;

the method comprising:
the processing unit:
- determining for a processing entity or group of processing entities to be processed by the processing unit, whether that entity or group of entities should be processed solely by executing a program using the programmable execution unit for that entity or group of entities, or whether that entity or group of entities should be processed solely by means of direct communication between the accelerators, or whether that entity or group of entities should be processed both by executing a program using the programmable execution unit for that entity or group of entities and by means of direct communication between the accelerators;

when it is determined that a processing entity or entities is to be processed by executing a program using the programmable execution unit, issuing an execution thread or threads for execution to the programmable execution unit in order to trigger processing operations for the entity or entities;

when it is determined that a processing entity or entities is to be processed by means of direct communication between the accelerators, issuing a message directly to one or more of the accelerators, in order to trigger processing operations for the entity or entities; and when it is determined that a processing entity or entities is to be processed, both by executing a program using the programmable execution unit for that entity or group of entities and by means of direct communication between the accelerators, issuing an execution thread or threads for execution to the programmable execution unit in order to trigger processing operations for the entity or entities, and issuing a message directly to one or more of the accelerators in order to trigger processing operations for the entity or entities.

* * * * *

UNITED STATES PATENT AND TRADEMARK OFFICE
CERTIFICATE OF CORRECTION

PATENT NO. : 10,089,709 B2
APPLICATION NO. : 15/208459
DATED : October 2, 2018
INVENTOR(S) : A. Engh-Halstvedt et al.

Page 1 of 1

It is certified that error appears in the above-identified patent and that said Letters Patent is hereby corrected as shown below:

In the Claims

Column 38, Line 32, Claim 13: Please delete "another of" and replace with -- another one of --.

Signed and Sealed this
Eleventh Day of December, 2018

Andrei Iancu
*Director of the United States Patent and Trademark Office*